United States Patent [19]

Sensui

[11] Patent Number: 5,568,323
[45] Date of Patent: Oct. 22, 1996

[54] ZOOM LENS

[75] Inventor: Takayuki Sensui, Tokyo, Japan

[73] Assignee: Asahi Kogaku Kogyo Kabushiki Kaisha, Tokyo, Japan

[21] Appl. No.: 348,096

[22] Filed: Nov. 25, 1994

[30] Foreign Application Priority Data

Nov. 25, 1993 [JP] Japan ................................. 5-295756
Sep. 26, 1994 [JP] Japan ................................. 6-229939

[51] Int. Cl.$^6$ ................................................ G02B 15/14
[52] U.S. Cl. .......................... 359/689; 359/686; 359/715
[58] Field of Search ................................. 359/686, 689, 359/715

[56] References Cited

U.S. PATENT DOCUMENTS

| | | | |
|---|---|---|---|
| 3,771,853 | 11/1973 | Nakamura | 359/686 |
| 4,516,839 | 5/1985 | Tokumaru | 359/686 |
| 4,846,562 | 7/1989 | Tokumaru et al. | 359/686 |
| 5,132,848 | 7/1992 | Nishio et al. | 359/686 |
| 5,229,886 | 7/1993 | Tanaka | 359/686 |
| 5,276,553 | 1/1994 | Tatsuno | 359/686 |
| 5,329,401 | 7/1994 | Sato | 359/686 |
| 5,365,376 | 11/1994 | Itoh | 359/715 |

FOREIGN PATENT DOCUMENTS 406082698  3/1988  Japan ................. 359/689

*Primary Examiner*—Georgia Y. Epps
*Assistant Examiner*—Evelyn A. Lester
*Attorney, Agent, or Firm*—Greenblum & Bernstein, P.L.C.

[57] ABSTRACT

A zoom lens includes a front or first lens group having a positive power and a rear lens group having a variable positive power, arranged in this order from an object side. The first lens group includes at least one negative lens and at least one positive lens. The negative lens of the first lens group is located closest to an object and is provided with a concave surface located on an image side. The concave surface is made of an aspherical surface whose radius of curvature increases to reduce the negative power as the height of the concave surface from the optical axis increases. The aspherical surface satisfies the formulae:

$$0.2 < H_{open}/H_{effect} < 0.7;\text{ and}$$

$$-0.1 < (\Delta X/f_w)\cdot(N-1) < -0.01,$$

wherein

"$H_{open}$" designates a height at which an axial marginal ray passes through the aspherical surface at a telephoto extremity; "$H_{effect}$" designates a maximum height at which an off-axis ray passes through the aspherical surface at a wide angle extremity; "$\Delta X$" designates an amount of asphericity at an effective height; "$f_w$" designates a focal length at the wide angle extremity; and "N" designates a refractive index of the lens material from which the aspherical surface is made.

9 Claims, 14 Drawing Sheets

WIDE ANGLE

TELEPHOTO

ZOOM LENS

BACKGROUND OF THE INVENTION

1. Field of the Invention

The present invention relates to a zoom lens, and in particular, it relates to a zoom lens in which an angle of view at a short focal length is more than 75° and a zoom ratio is approximately 2.5 to 3.1.

2. Description of Related Art

There is known a zoom lens whose angle of view at a short focal length is larger than 75° and whose zoom ratio is approximately 2.5 to 3. Such a zoom lens constitutes, at a short focal length, a retrofocus type in which there is a negative lens and a positive lens in this order from an object side and, at a long focal length, either a telephoto type in which there is a positive lens and a negative lens in this order from the object side or an approximate telephoto type in which there are two positive lenses having a relatively small positive refractive power on the side adjacent to an image.

However, It is practically difficult to realize a zoom lens having a large aperture and a high performance while maintaining a sufficient back focal distance.

SUMMARY OF THE INVENTION

It is an object of the present invention to provide a zoom lens having a high optical performance and a sufficient back focal distance, which can be advantageously used for an automatic focusing mechanism or a powered zoom lens camera, by effectively utilizing an aspherical lens surface provided on the zoom lens.

To achieve the object mentioned above, according to an aspect of the present invention, there is provided a zoom lens including a front or first lens group having a negative power and a rear lens group having a variable positive power, arranged in this order from an object side. The first lens group includes at least one negative lens and at least one positive lens and a negative lens of the first lens group being located closest to an object is provided with a concave surface located on an image side. The concave surface is made of an aspherical surface whose radius of curvature increases to reduce the negative power as the height of the concave surface from the optical axis increases. The aspherical surface satisfies the following formulae:

$$0.2 < H_{open}/H_{effect} < 0.7; \quad (1)$$

$$-0.1 < (\Delta X/f_w) \cdot (N-1) < -0.01, \quad (2)$$

wherein "$H_{open}$" designates a height at which an axial marginal ray passes through the aspherical surface at a telephoto extremity; "$H_{effect}$" designates a maximum height at which an off-axis ray passes through the aspherical surface at a wide angle extremity; "$\Delta X$" designates an amount of asphericity at an effective height; "$f_w$" designates a focal length at the wide angle extremity; and "N" designates a refractive index of a lens material from which the aspherical surface is made.

Preferably, the aspherical surface of the concave surface located on the image side of the negative lens belonging to the first lens group satisfies the following formula:

$$0.2 < (R_{ASP}/f_w) \cdot (N-1) < 1.0, \quad (3)$$

wherein "$R_{ASP}$" designates a paraxial radius of curvature of the aspherical surface.

The aspherical surface of the concave surface located on the image side of the negative lens belonging to the first lens group can be made of, for example, a resin layer cemented to a glass lens.

Preferably, the aspherical surface of the concave surface belonging to the first lens group satisfies the following formula:

$$0.03 < (R_1 - R_2)/f_w < 0.2 \quad (4)$$

wherein "$R_1$" designates a radius of curvature of the cemented surface; and, "$R_2$" designates a paraxial radius of curvature of the aspherical surface of the negative lens belonging to the first lens group.

The rear lens group having a variable positive power includes at least three lens groups including a second lens group having a positive power, a third lens group having a negative power, and a fourth lens group having a positive power, arranged in this order from the object side. The rear lens group is further arranged such that the distance between the second lens group and third lens group increases as the distance between the third lens group and the fourth lens group decreases during a magnification transition from the wide angle extremity to the telephoto extremity.

According to another aspect of the present invention, there is provided a zoom lens including a first lens group having a negative power, a second lens group having positive power, a third lens group having negative power, and a fourth lens group having a positive power, arranged in this order from the object side. During the magnification transition from the wide angle extremity to the telephoto extremity, the distance between the second lens group and the third lens group increases as the distance between the third lens group and the fourth lens groups decreases. The zoom lens satisfies the following formulae:

$$1.1 < f_t/|f_1| < 1.9; \quad (5)$$

$$0.9 < Z_2/Z < 1.1; \quad (6)$$

$$|m_{4t}| < 0.12, \quad (7)$$

wherein "$f_t$" designates a focal length at the telephoto extremity; "$f_1$" designates a focal length of the first lens group; "$Z_2$" designates a ratio of magnifications of the second lens group, in which $Z_2 = m_{2t}/m_{2w}$, where $m_{2t}$ designates a magnification of the second lens group at the telephoto extremity and $m_{2w}$ designates a magnification of the second lens group at the wide angle extremity; "Z" designates a zooming ratio of a whole lens system; and "$m_{4t}$" designates a magnification of the fourth lens group at the telephoto extremity.

Preferably, a diaphragm 15 provided, for example, between the second and third lens groups, so that the distance between the diaphragm and the image surface satisfies the following formula:

$$2.3 < X_s/f_w < 2.85, \quad (8)$$

wherein "$X_s$" designates a distance between the diaphragm and the image surface at the wide angle extremity.

Preferably, the third lens group, for example, is integrally secured to the diaphragm so as not to move during the variation of magnification.

The present disclosure relates to subject matter contained in the Japanese patent application No.05-295756 (filed on Nov. 25, 1993) and the Japanese patent application No.06-229939 (filed on Sep. 26, 1994) which are expressly incorporated herein by reference in their entireties.

BRIEF DESCRIPTION OF THE DRAWINGS

The invention will be described below in detail with reference to the accompanying drawings, in which.

DESCRIPTION OF THE PREFERRED EMBODIMENT

In a zoom lens according to the present invention, a first negative lens of a first lens group that is located closest to an object to be photographed is provided with a concave and aspherical surface located on an image side, as discussed below.

Figure 27:
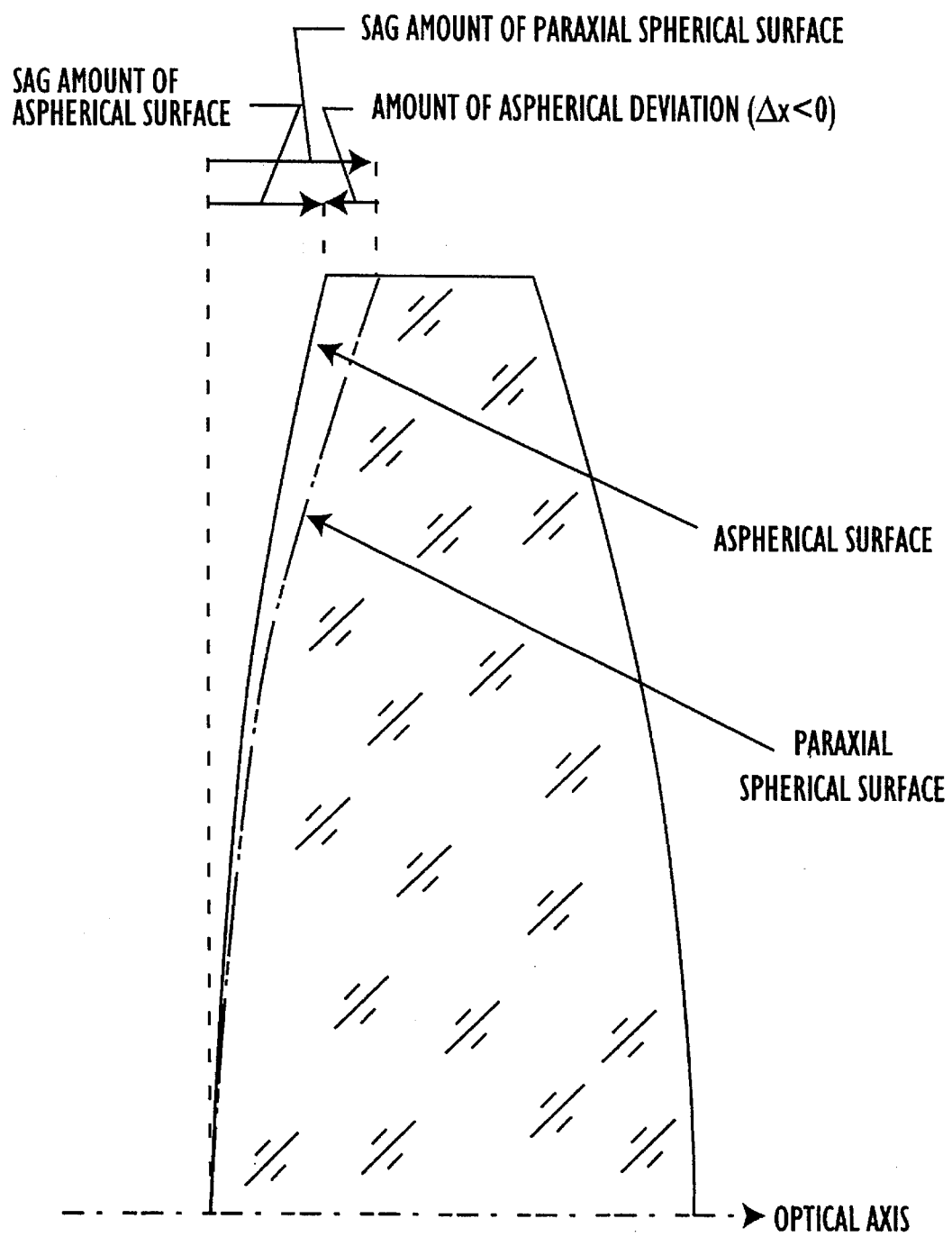
FIG. 27 is an enlarged explanatory view of an aspheric lens to explain the amount of aspheric deviation and sag amount.

In general, it is necessary to reduce the thickness of the lens at a peripheral edge portion to correct for distortion. There are two methods to reduce the thickness of an aspherical lens at the peripheral edge portion. In a first method, a positive aspherical amount of the aspherical surface is provided on a surface adjacent to the object to be photographed, wherein the aspherical surface is located closer to an image than a reference paraxial spherical surface. In a second method, a negative aspherical amount of the aspherical surface is provided on the surface adjacent to the image, wherein the aspherical surface is located closer to the object than a reference paraxial spherical surface. However, in the first method, the radius of curvature of the aspherical surface is smaller than the radius of curvature of the reference paraxial spherical surface, and accordingly, the astigmatism and the spherical aberration are increased in comparison with an absence of an aspherical surface. Moreover, if the sign of the aspherical amount of the aspherical surface is the same as the sign of the reference paraxial spherical surface to be made aspheric, the aberrations are increased, and hence, the subsequent lens surfaces have an increased requirement to correct for aberrations, leading to an occurrence of high-order aberrations. Note that the sign of the paraxial spherical surface is positive when a center of curvature of the paraxial spherical surface is located closer to the image than to the paraxial spherical surface. In addition to the foregoing, the lens diameter is too large to easily produce the lens, resulting in manufacturing errors. In the case of a cemented aspherical surface, the first lens surface tends to be easily physically damaged or scratched. FIG. 27 shows the relationship between the paraxial spherical surface, the aspherical surface, the amount of aspheric deviation, the sag amount of the paraxial spherical surface, and the sag amount of the aspherical surface.

In the second method in which the lens is provided on the surface adjacent to the image with a concave surface which is an aspherical surface having a negative aspherical amount, the curve radius of the aspherical surface is larger than the curve radius of the reference paraxial spherical surface, and accordingly, only a small amount of astigmatism and the spherical aberration occurs. Moreover, the sign (+) of the aspherical amount of the aspherical surface is opposite to the sign (−) of the reference spherical surface, so that the aberrations can be cancelled and eliminated. Consequently, not only can the subsequent lens surfaces have a reduced aberration correction requirement, but also the occurrence of the high-order aberrations can be restricted. Furthermore, lens diameter can be reduced, and accordingly, the lens can be easily produced. In the case of the aspherical surface being formed by a resin layer on a glass lens, the second surface and the subsequent lens surfaces can be made of aspherical surfaces which can be more effectively protected from being damaged or scratched.

In the case of an automatic focusing (AF) zoom lens or a powered zoom lens (PZ), the movable lenses thereof must be light. In particular, if the diameter of the first lens group is increased to realize a wider angle lens, the first lens group becomes heavy. If the surface of the first negative lens belonging to the first lens group located closest to an object is provided with an aspherical surface on an image side, the number of the lenses of the first lens group can be reduced, resulting in a lighter weight lens system. This also contributes to a reduction of the lens diameter. It is preferable that the first lens group is made of a negative (aspherical) lens, a negative lens, and a positive lens to meet both of the requirements for a reduction of the number in lenses and an improvement of the optical efficiency for a well-balanced optical system.

Figure 25:
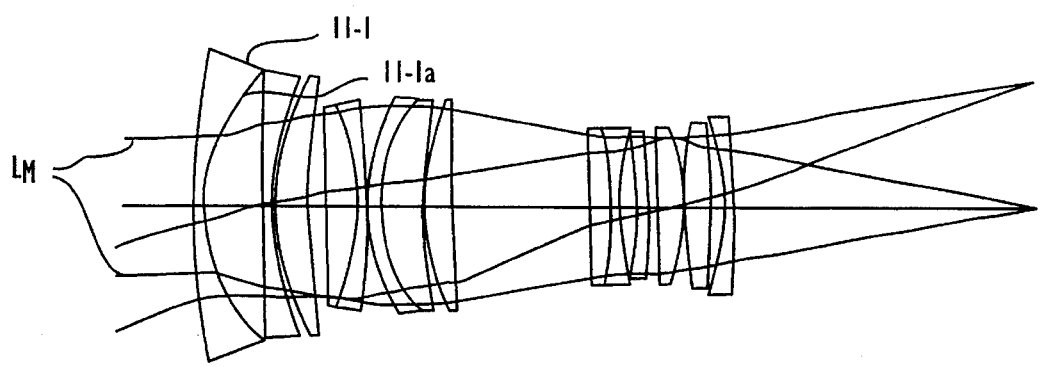
FIG. 25 shows a schematic view of optical paths at the telephoto extremity to explain the requirement specified by the formula (1)
Figure 26:
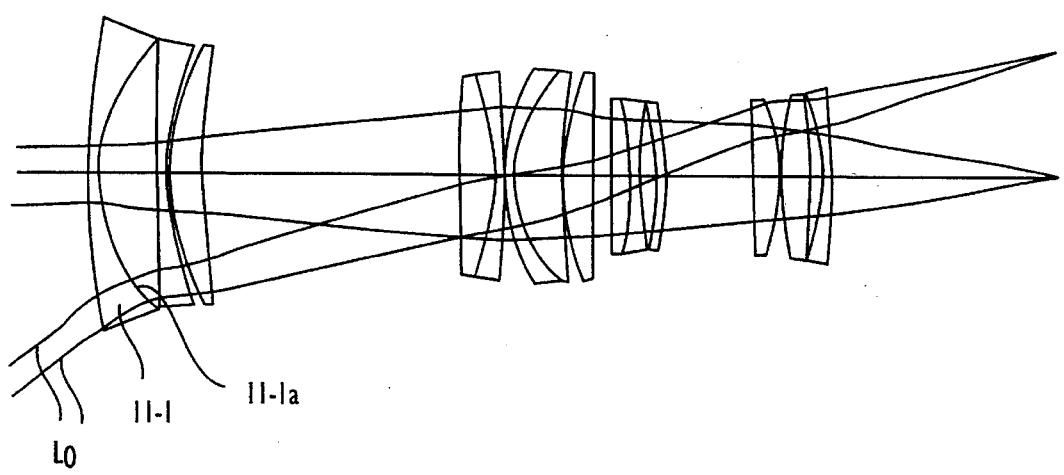
FIG. 26 shows a schematic view of optical paths at the wide angle extremity to explain the requirement specified by the formula (1)

Formula (1) specifies the height of the aspherical surface of the negative lens of the first lens group at which the axial marginal rays at the telephoto extremity and the off-axis rays at the wide angle extremity pass through the aspherical surface. FIG. 25 shows an example of a ray $L_M$ of the axial marginal rays at the telephoto extremity and FIG. 26 shows an example of a ray $L_O$ of the off-axis rays at the wide angle extremity, according to the present invention.

The axial marginal rays $L_M$ and the off-axis rays $L_O$ pass through the aspherical surface 11-1a of the first negative lens 11-1 at different heights, and hence, the bundles $L_M$ and $L_O$ can experience different amounts of refraction due to the aspherical surface 11-1a. Namely, since the aspherical surface 11-1a can be optionally shaped at an optional height, the amount of refraction of the rays $L_M$ and $L_O$ at the telephoto extremity and the wide angle extremity can be controlled. Such control is impossible with spherical surfaces. Thus, the spherical aberration at the telephoto extremity and the curvature of the field (astigmatism) and the distortion at the wide angle extremity can be effectively corrected. If the ratio defined in the formula (1) exceeds the upper limit, it is difficult to independently correct the spherical aberration at the telephoto extremity and the off-axis aberration at the wide angle extremity. If the ratio is below the lower limit in the formula (1), it is difficult to correct the spherical aberration at the telephoto extremity.

The formula (2) shows that the aspherical surface weakens the negative refractive power of a spherical surface as a reference surface as the height (distance) H of the aspherical surface from the optical axis increases. If the value defined in the formula (2) is above the upper limit (i.e., the amount of asphericity is small), the negative distortion at the wide angle extremity or in the vicinity thereof cannot be effectively corrected. Conversely, if the value is smaller than the lower limit (i.e., the amount of asphericity is large), an over compensation for the amount of aberration occurs at the telephoto extremity or in the vicinity thereof. Moreover, it is difficult to produce the lens.

The formula (3) relates to the paraxial radius of curvature of the aspherical surface and represents the contribution to the correction of the off-axis aberration in the vicinity of the wide angle extremity. If the value defined in the formula (3) exceeds the upper limit, the radius of curvature is too large to correct the off-axis aberration, particularly the astigmatism, in the vicinity of the wide angle extremity. Conversely, if the value is smaller than the lower limit, the radius of curvature is so small that it is difficult to produce the lens without an error.

The formula (4) is related to the thickness of the resin material from which the aspherical surface is made and represents the degree of uniformity of the thickness of the resin material depending on the height H from the optical axis. If the ratio is above the upper limit, the thickness of the resin layer is so large at the peripheral edge of the lens that the lens cannot be molded or an excessive internal strain tends to occur. If the ratio is smaller than the lower limit, effective correction of the aberrations cannot be expected.

The formula (5) relates to the power of the first lens group. If the ratio defined in the formula (5) exceeds the upper limit, the power of the first lens group is too strong, making correction of aberration difficult enough though the displacement of the first lens group can be decreased during the zooming. Conversely, if the ratio is smaller than the lower limit, the power of the first lens group is so small that there is too large a displacement of the first lens group, thus resulting in a difficulty in making such a mechanical structure. Moreover, in the vicinity of the wide angle extremity, the amount of light which passes at the pheripheral portion of the lens and photographability at a close object distance decreases.

The formula (6) relates to the variable power of the second lens group. The formula represents that the variation of the ratio of the magnification ratio is almost carried out by the second lens group alone and that the third and fourth lens groups are mainly adapted to correct the aberrations. If the ratio exceeds the upper limit, the power varying function of the second lens group is so strong that there is too large a fluctuation in the aberration (particularly, spherical aberration), an increase in the whole length of the optical system and an increase in the number of the lens elements, etc. If the ratio is smaller than the lower limit, the third and fourth lens groups function to vary the magnification, so that there is too large a variation in the astigmatism during the zooming. The value of the lower limit in the formula (6) is preferably larger than 1.0.

The formula (7) specifies the magnification of the fourth lens group and represents that the first to third lens groups are substantially focal lenses in the vicinity of the telephoto extremity. If the absolute value defined in the formula (7) exceeds the upper limit, the fluctuation of the astigmatism caused by the change of the distance between the third and fourth lens groups during the zooming is too large.

The formula (8) specifies the position of the diaphragm. If the ratio of the formula (8) is smaller than the lower limit, the diaphragm is located too rearward to allow for a frame or other mechanical members for an automatic focusing motor or a zooming motor, etc. If the ratio is larger than the upper limit, the aperture at the telephoto extremity is too large. In any event, the size of the optical system in the radial direction is increased, which is not acceptable in view of the operation of a large aperture lens. The mechanism can be simplified by securing the diaphragm, whose structure is usually complex, to the third lens group. Hence no deviation or failure to align the optical axes of the lenses takes place.

The second lens group is preferably comprised of a positive lens, a cemented lens consisting of a negative lens and a positive lens, and a positive lens, in this order from the object side. The second lens group further includes a divergent aspherical surface and a divergent cemented surface. Alternatively, the second lens can be comprised of a cemented lens consisting of a positive lens and a negative lens, a cemented lens consisting of a negative lens and a positive lens, and a positive lens, in this order from the object side. The second lens group further includes a divergent cemented surface or surfaces.

Figure 1:
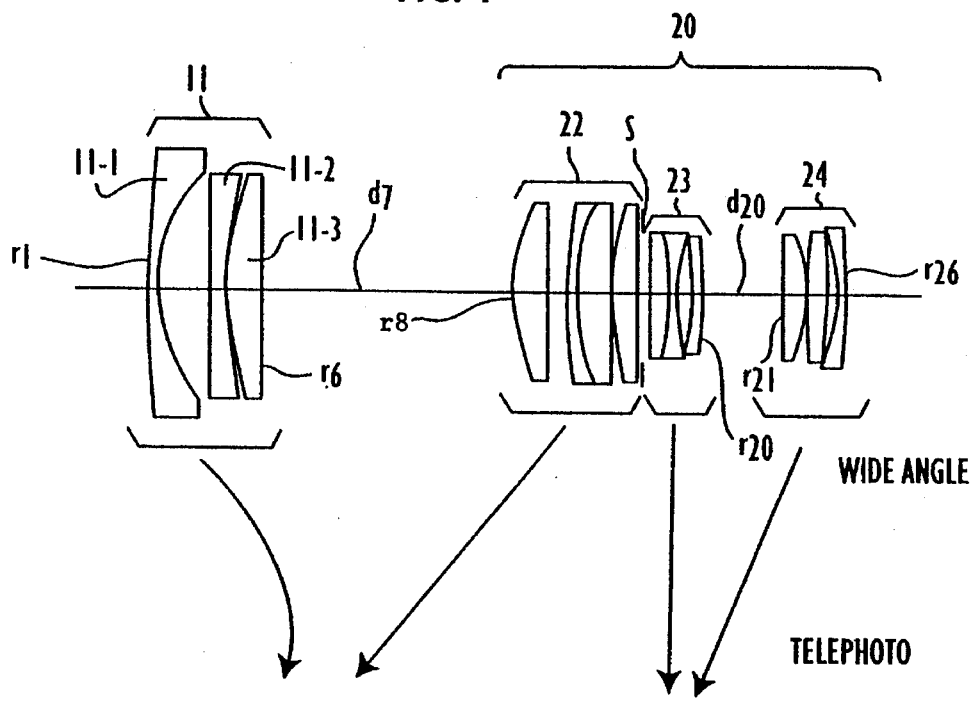
FIG. 1 is a schematic view of a lens arrangement of a zoom lens system, according to a first embodiment of the present invention.

FIG. 1 shows a lens arrangement of a zoom lens according to a first embodiment comprising a first lens group 11 having negative power and a rear lens group 20 having positive power. The first lens group 11 is comprised of a negative lens 11-1, whose concave surface is located on an image side, a negative lens 11-2, and a positive lens 11-3. The surface of negative lens 11-1 has on the image side an aspherical surface which is made of a resin layer cemented to a glass lens. The rear lens group 20 is comprised of a second lens group 22 having a positive power, a third lens group 23 having a negative power and a fourth lens group 24 having a positive power. The second lens group 22 is comprised of a first positive lens, a cemented second lens consisting of a positive lens and a negative lens, and a third positive lens. The object side surface of the first positive lens is a divergent aspherical surface, which refers to an aspherical surface which provides a divergence to the surface refractive power of the base paraxial spherical surface. A diaphragm S is located between the second and third lens groups 22 and 23. The loci of the movements of the first through fourth lens groups during the zooming operation are indicated in the lower portion of the lens arrangement shown in FIG. 1. Note that the third lens group 23 is integral with the diaphragm S and does not move during the zooming.

Numerical data of the zoom lens system shown in FIG. 1 is shown in Table 1 below. Diagrams of various aberrations thereof at a wide-angle extremity, an intermediate focal length and a telephoto extremity are shown in FIGS. 2, 3 and 4, respectively.

Figure 2:
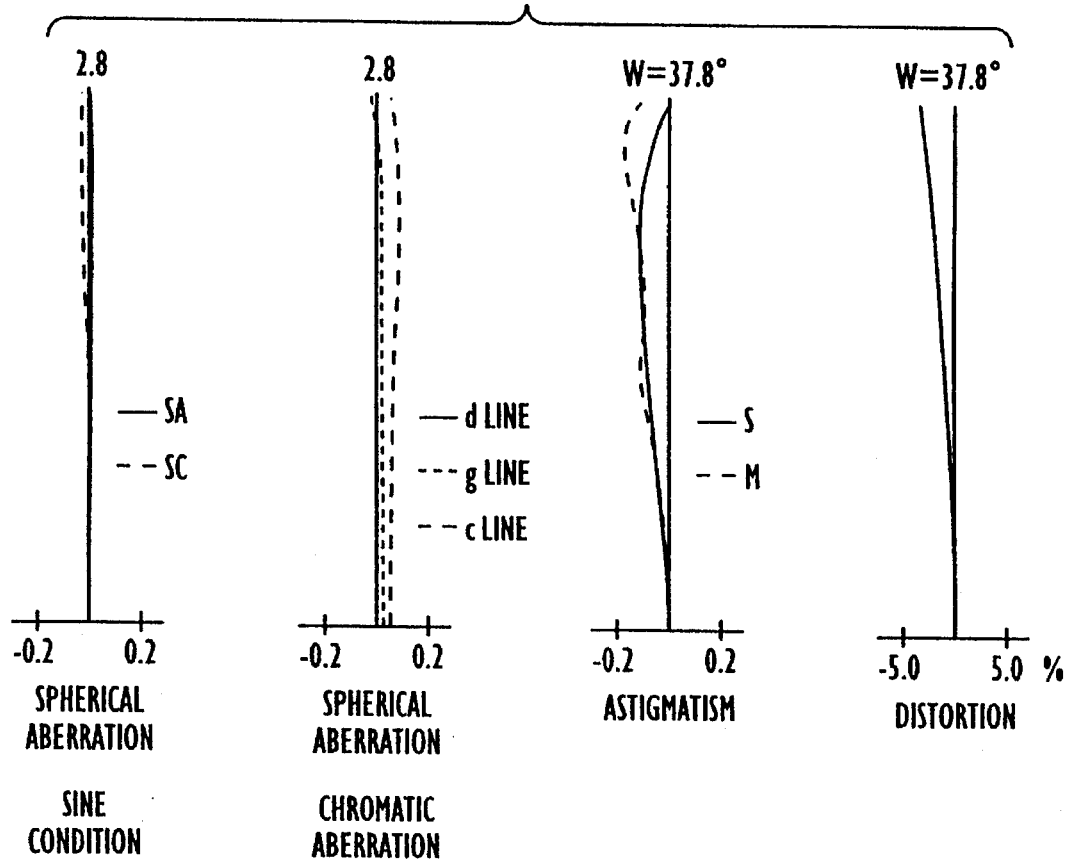
FIG. 2 shows various aberration diagrams of a zoom lens system shown in FIG. 1 at a wide angle extremity thereof.
Figure 3:
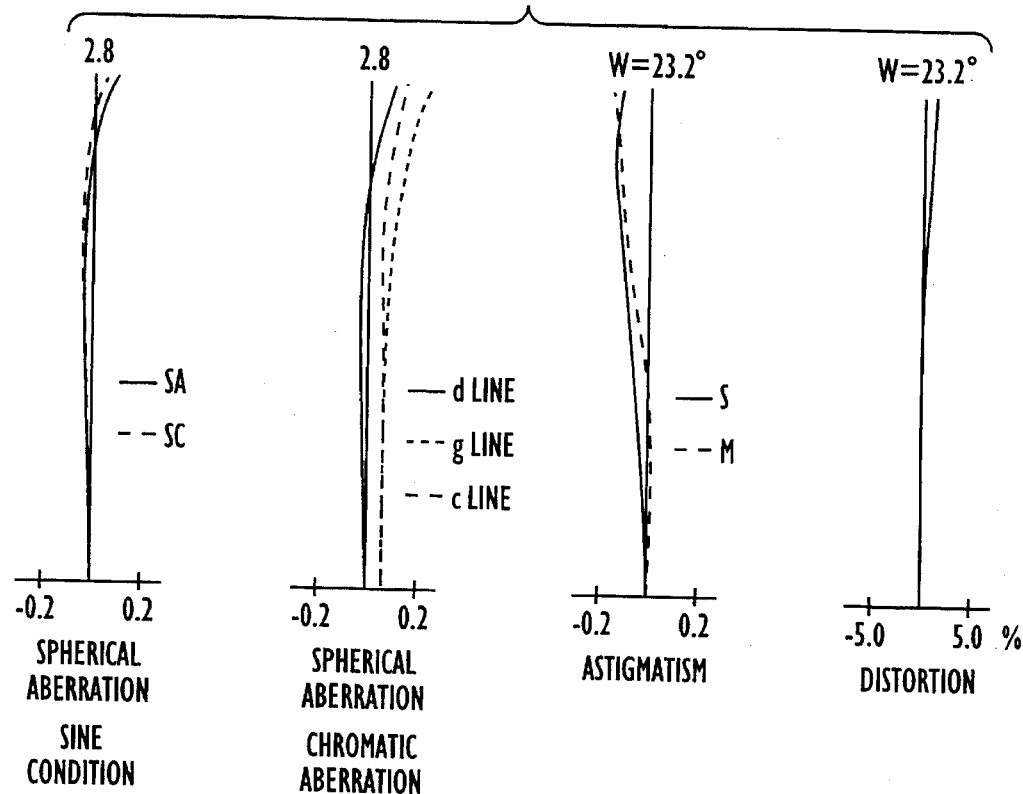
FIG. 3 shows various aberration diagrams of a zoom lens system shown in FIG. 1 at an intermediate focal length.
Figure 4:
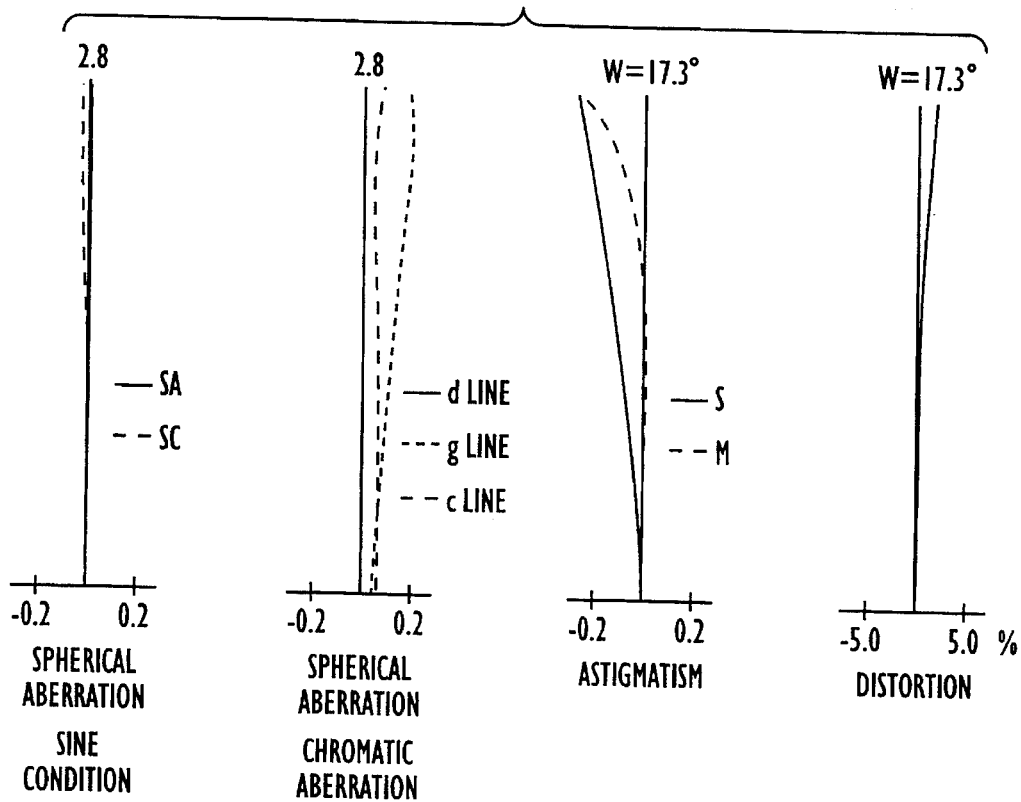
FIG. 4 shows various aberration diagrams of a zoom lens system shown in FIG. 1 at a telephoto extremity.

In FIGS. 2, 3, and 4, "SA" designates the spherical aberration, "SC" the sine condition, "d-line", "g-line" and "C-line" the chromatic aberration represented by the spherical aberration at the respective wavelengths, "S" the sagittal ray, and "M" the meridional ray, respectively.

In the tables and the drawings, "$F_{NO}$" designates the f-number, "f" the focal length, "ω" the half angle of view, "$f_B$" the back-focal distance, "r" the radius of curvature of each lens surface, "d" the lens thickness or the distance between the lenses, "Nd" the refractive index of the d-line, and "νd" the Abbe number of the d-line, respectively.

TABLE 1

$F_{NO}$ = 1:2.8–2.8–2.8
f = 29.00–50.00–68.00
ω = 37.8–23.2–17.3
$f_B$ = 39.72–39.72–39.72

| surface No. | r | d | Nd | νd |
|---|---|---|---|---|
| 1 | 201.329 | 2.08 | 1.78590 | 44.2 |
| 2 | 33.552 | 0.13 | 1.52010 | 50.8 |
| 3* | 29.660 | 10.78 | — | — |
| 4 | –168.590 | 2.00 | 1.77250 | 49.6 |
| 5 | 84.817 | 0.20 | — | — |
| 6 | 64.136 | 5.87 | 1.84666 | 23.9 |
| 7 | –1170.000 | 47.73–13.37–1.53 | — | — |
| 8* | 40.900 | 0.10 | 1.52010 | 50.8 |
| 9 | 40.900 | 6.80 | 1.48749 | 70.2 |
| 10 | –263.618 | 3.73 | — | — |
| 11 | 100.246 | 1.70 | 1.80518 | 25.4 |
| 12 | 32.457 | 6.50 | 1.48749 | 70.2 |
| 13 | 617.603 | 0.10 | — | — |
| 14 | 51.821 | 5.18 | 1.69680 | 55.5 |
| 15 | –305.000 | 1.10–12.31–21.79 | — | — |
| STOP | ∞ | 1.51 | — | — |
| 16 | –3666.343 | 3.50 | 1.80518 | 25.4 |
| 17 | –41.450 | 1.50 | 1.53172 | 48.9 |
| 18 | 41.450 | 3.60 | — | — |
| 19 | –32.725 | 1.80 | 1.53172 | 48.9 |
| 20 | –146.696 | 15.16–8.10–2.66 | — | — |
| 21 | 4545.063 | 4.44 | 1.59240 | 68.3 |
| 22 | –30.134 | 0.10 | — | — |
| 23 | 111.252 | 3.90 | 1.59240 | 68.3 |

TABLE 1-continued

| 24 | –74.000 | 2.18 | — | — |
|---|---|---|---|---|
| 25 | –28.700 | 1.60 | 1.75520 | 27.5 |
| 26 | –90.100 | — | — | — |

*marked surface is aspherical.
NO. 3: K = 0.0, A4 = –0.39966 × 10$^{-5}$,
A6 = –0.41814 × 10$^{-8}$, A8 = 0.29596 × 10$^{-11}$,
A10 = –0.75317 × 10$^{-14}$, A12 = 0.0
NO. 8: K = 0.0, A4 = –0.29949 × 10$^{-5}$,
A6 = –0.68772 × 10$^{-9}$, A8 = 0.82270 × 10$^{-12}$,
A10 = –0.20241 × 10$^{-14}$, A12 = 0.0

The shape of the aspheric surface can be generally expressed as follows.

$$X = CY^2/\{1+[1-(1+K)C^2Y^2]^{1/2}\} + A_4Y^4 + A_6Y^6 + A_8Y^8 + A_{10}Y^{10} + \ldots$$

wherein,

Y represents a height above the axis,

X represents a distance from a tangent plane of an aspherical vertex,

C represents a curvature of the aspherical vertex(1/r),

K represents a conic constant, $A_4$ represents a fourth-order aspherical factor, $A_6$ represents a sixth-order aspherical factor, $A_8$ represents a eighth-order aspherical factor, $A_{10}$ represents a tenth-order aspherical factor.

Figure 5:
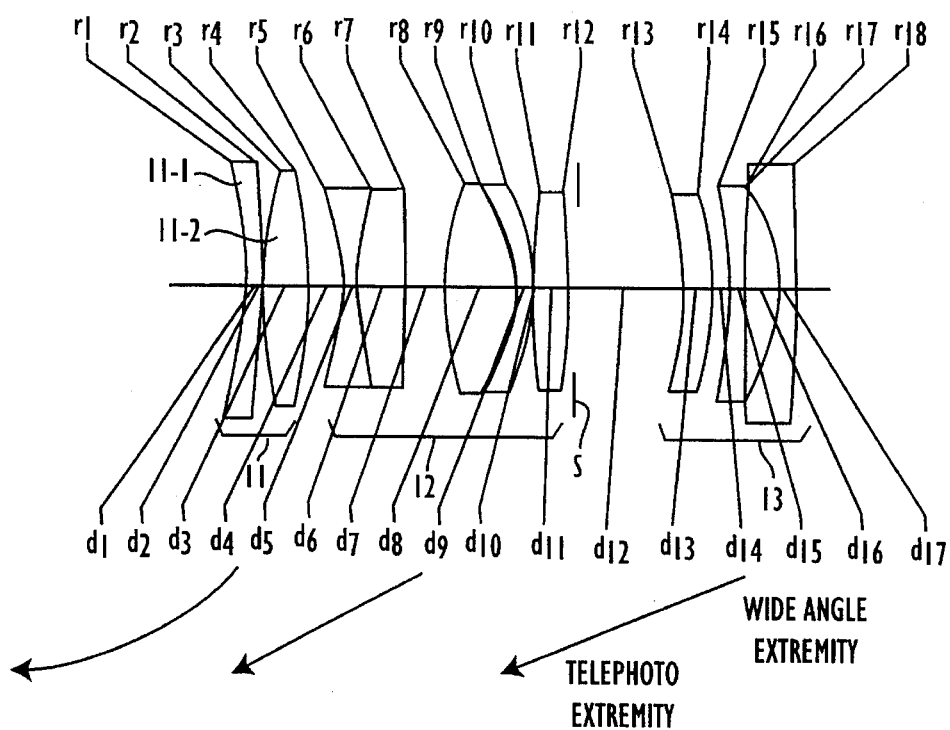
FIG. 5 is a schematic view of a lens arrangement of a zoom lens system, according to a second embodiment of the present invention.

FIG. 5 shows a lens arrangement of a zoom lens according to a second embodiment of the present invention. The lens arrangement in the second embodiment is substantially identical to that of the first embodiment, except that the terminal lens surface of the second lens group 22 closest to the object in FIG. 5. is the divergent aspherical surface.

Figure 6:
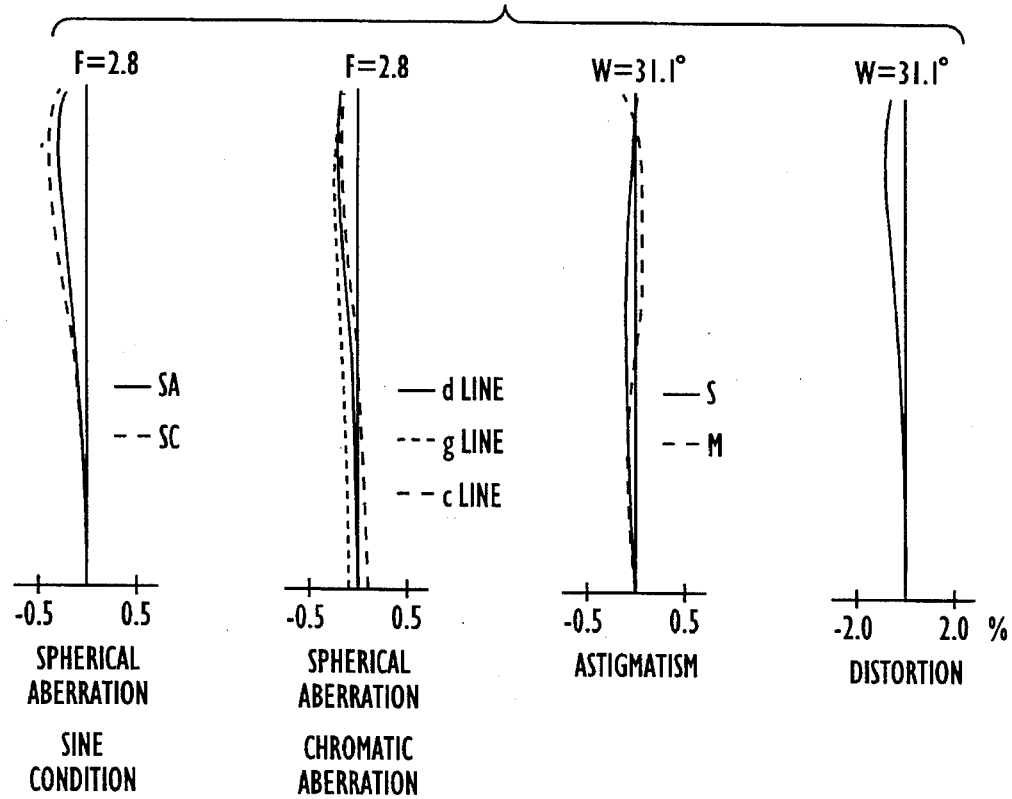
FIG. 6 shows various aberration diagrams of a zoom lens system shown in FIG. 5 at a wide angle extremity thereof.
Figure 7:
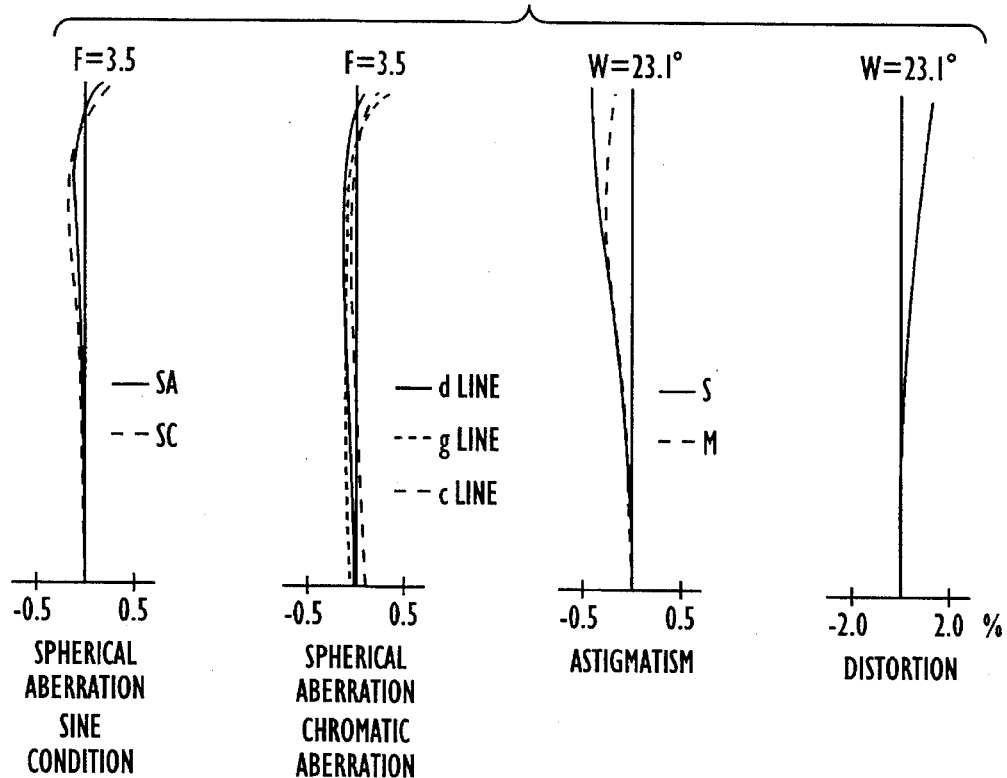
FIG. 7 shows various aberration diagrams of a zoom lens system shown in FIG. 5 at an intermediate focal length.
Figure 8:
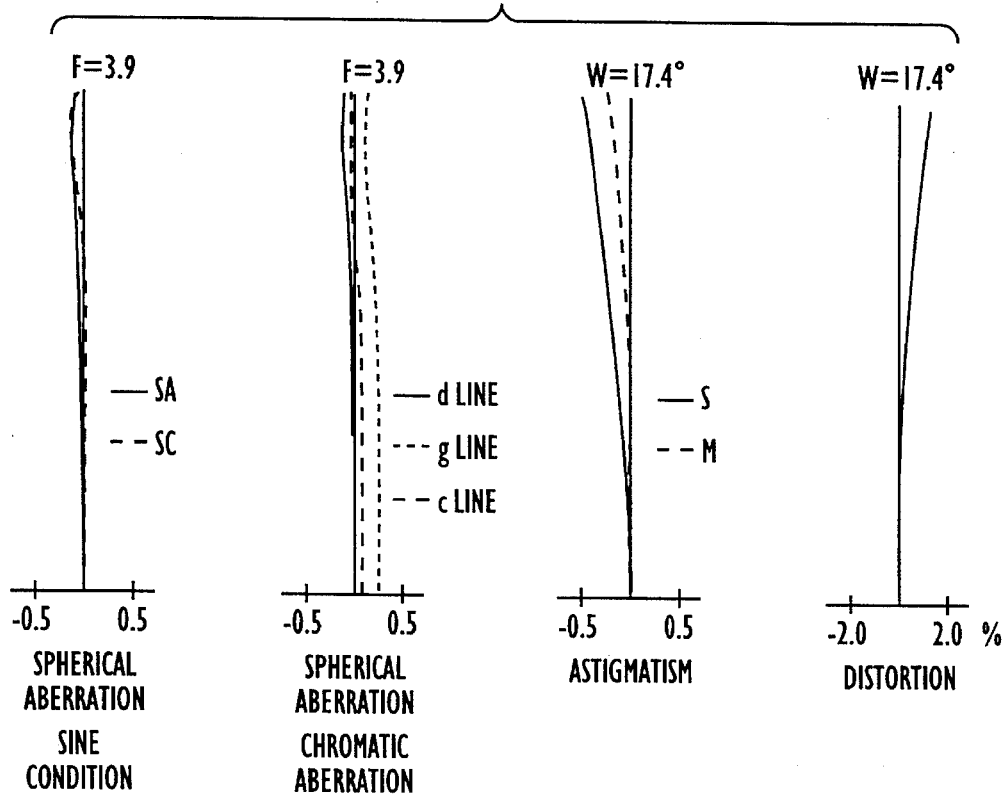
FIG. 8 shows various aberration diagrams of a zoom lens system shown in FIG. 5 at a telephoto extremity.

Numerical data of the lens system shown in FIG. 5 is shown in Table 2 below. Diagrams of various aberrations thereof at a wide-angle extremity, an intermediate focal length and a telephoto extremity are shown in FIGS. 6, 7 and 8, respectively.

TABLE 2

$F_{NO}$ = 1:2.8–2.8–2.8
f = 29.00–50.00–68.00
ω = 37.8–23.2–17.3
$f_B$ = 38.74–38.74–38.74

| surface No. | r | d | Nd | νd |
|---|---|---|---|---|
| 1 | 205.777 | 2.00 | 1.78590 | 44.2 |
| 2 | 32.445 | 0.13 | 1.52010 | 50.8 |
| 3* | 28.555 | 10.44 | — | — |
| 4 | –303.554 | 2.00 | 1.77250 | 49.6 |
| 5 | 82.015 | 0.20 | — | — |
| 6 | 58.493 | 6.01 | 1.84666 | 23.9 |
| 7 | 898.697 | 48.10–13.45–1.50 | — | — |
| 8 | 42.730 | 4.75 | 1.59240 | 68.3 |
| 9 | 180.989 | 2.08 | — | — |
| 10 | 858.995 | 1.70 | 1.84666 | 23.9 |
| 11 | 51.095 | 6.40 | 1.48749 | 70.2 |
| 12 | –100.470 | 0.10 | — | — |
| 13* | 45.297 | 0.10 | 1.52010 | 50.8 |
| 14 | 45.297 | 6.86 | 1.69680 | 55.5 |
| 15 | –964.373 | 2.53–14.00–23.63 | — | — |
| STOP | ∞ | 1.39 | — | — |
| 16 | 1303.927 | 3.56 | 1.80518 | 25.4 |
| 17 | –56.499 | 1.50 | 1.55963 | 61.2 |
| 18 | 56.499 | 3.68 | — | — |
| 19 | –43.761 | 1.80 | 1.55963 | 0.0 |
| 20 | 2067.812 | 15.74–8.70–3.09 | — | — |
| 21 | –267.321 | 4.80 | 1.59240 | 68.3 |

TABLE 2-continued

| | | | | |
|---|---|---|---|---|
| 22 | −29.739 | 0.10 | — | — |
| 23 | 60.415 | 4.60 | 1.59240 | 68.3 |
| 24 | −89.154 | 2.09 | — | — |
| 25 | −32.189 | 1.60 | 1.80518 | 25.4 |
| 26 | −156.925 | — | — | — |

Figure 9:
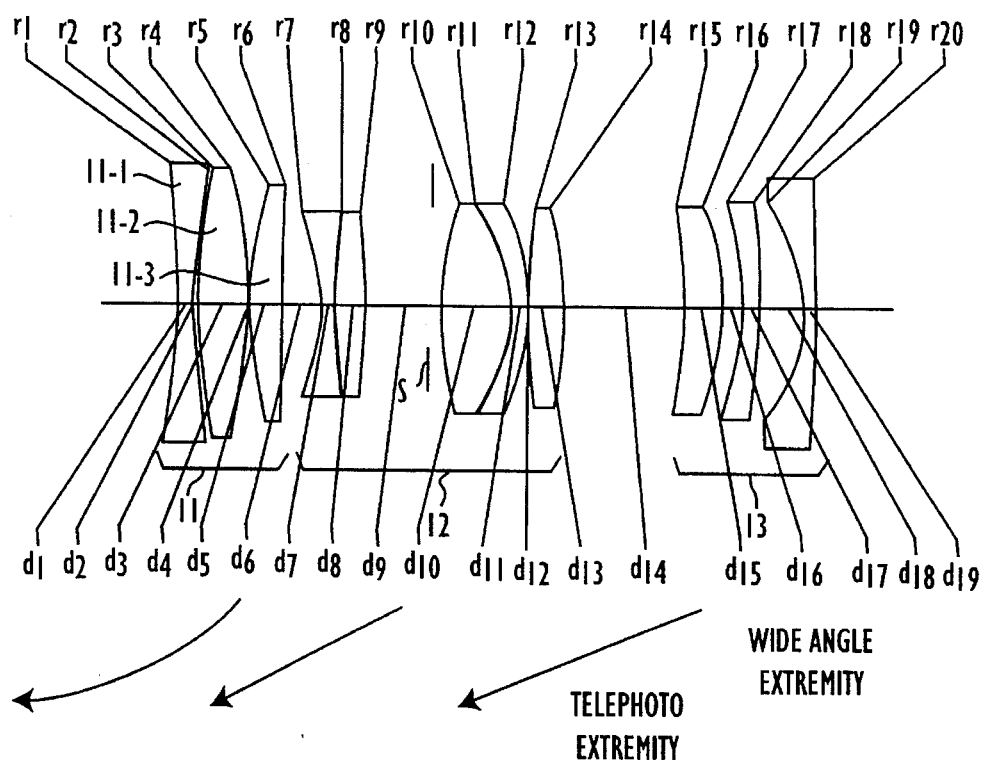
FIG. 9 is a schematic view of a lens arrangement of a zoom lens system, according to a third embodiment of the present invention.

*marked surface is aspherical.
NO. 3:  $K = 0.0$, $A4 = -0.38313 \times 10^{-5}$,
$A6 = -0.56731 \times 10^{-8}$, $A8 = 0.48649 \times 10^{-11}$,
$A10 = -0.11680 \times 10^{-13}$, $A12 = 0.0$
NO. 13: $K = 0.0$, $A4 = -0.30059 \times 10^{-5}$,
$A6 = -0.25869 \times 10^{-8}$, $A8 = 0.13157 \times 10^{-11}$,
$A10 = -0.56482 \times 10^{-14}$, $A12 = 0.0$ FIG. 9 shows a lens arrangement of a zoom lens according to a third embodiment of the present invention. In the third embodiment, the rear lens group 20 does not include an aspherical surface. Also, the second lens group 22 is comprised of a cemented first lens consisting of a positive lens and a negative lens, a cemented second lens consisting of a negative lens and a positive lens, and a third positive lens, in this order from the object side. The other structure of the third embodiment is substantially the same as the first embodiment.

Figure 10:
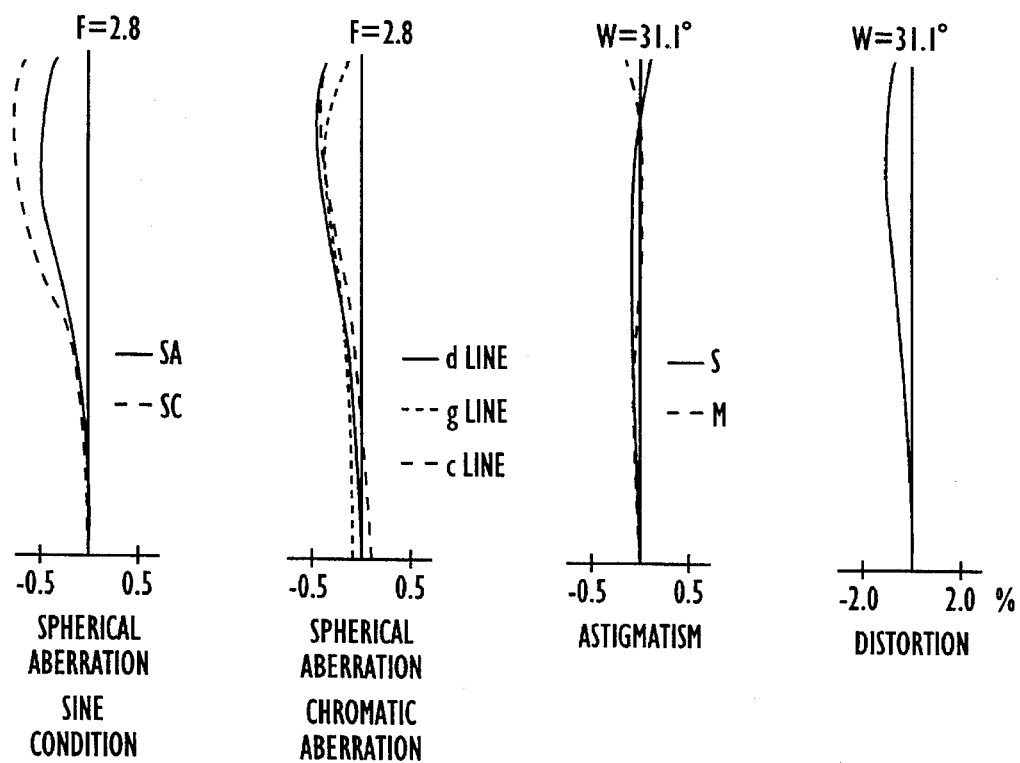
FIG. 10 shows various aberration diagrams of a zoom lens system shown in FIG. 9 at a wide angle extremity thereof.
Figure 11:
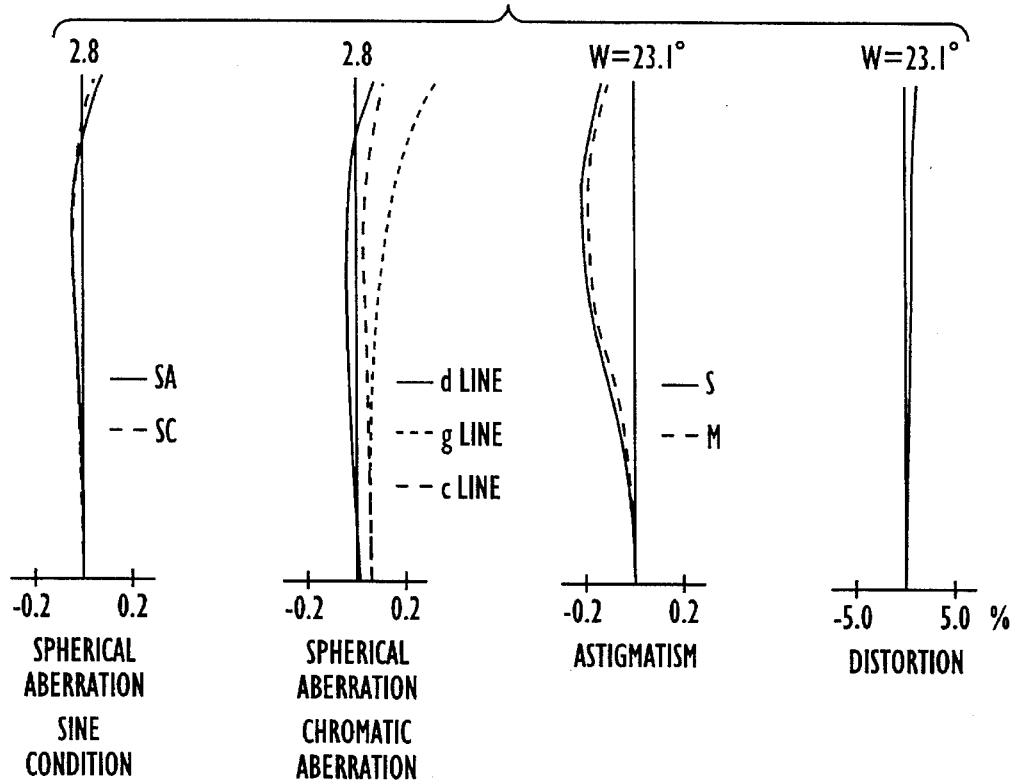
FIG. 11 shows various aberration diagrams of a zoom lens system shown in FIG. 9 at an intermediate focal length; and, FIG. 12 shows various aberration diagrams of a zoom lens system shown in FIG. 9 at a telephoto extremity.
Figure 12:
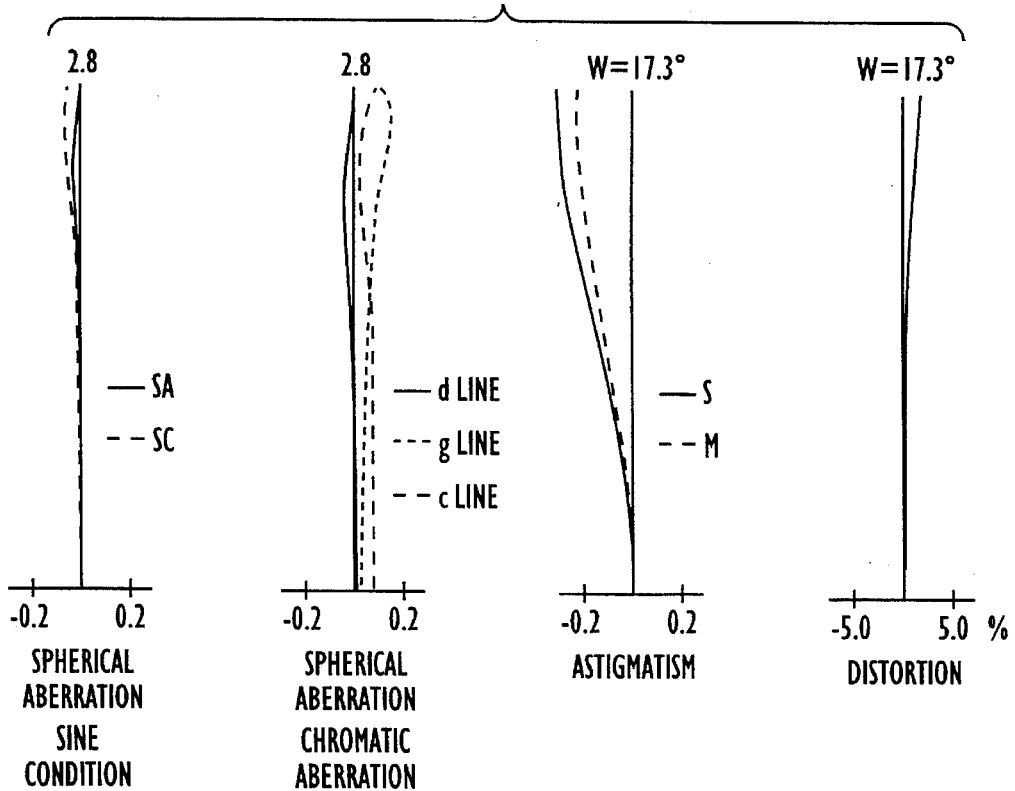

Numerical data of the lens system shown in FIG. 9 is shown in Table 3 below. Diagrams of various aberrations thereof at a wide-angle extremity, an intermediate focal length and a telephoto extremity are shown in FIGS. 10, 11 and 12, respectively.

TABLE 3

$F_{NO} = 1:2.8–2.8–2.8$
$f = 29.00–50.00–68.00$
$\omega = 37.8–23.1–17.3$
$f_B = 39.87–39.87–39.87$

| surface No. | r | d | Nd | vd |
|---|---|---|---|---|
| 1 | 109.125 | 2.00 | 1.77250 | 49.6 |
| 2 | 30.621 | 0.13 | 1.52010 | 50.8 |
| 3* | 28.008 | 10.45 | — | — |
| 4 | −894.000 | 2.00 | 1.72916 | 54.7 |
| 5 | 50.854 | 0.20 | — | — |
| 6 | 43.000 | 5.50 | 1.84666 | 23.9 |
| 7 | 134.343 | 44.65–13.61–2.97 | — | — |
| 8 | 3898.795 | 5.35 | 1.77250 | 49.6 |
| 9 | −37.770 | 1.50 | 1.71736 | 29.5 |
| 10 | −171.000 | 0.10 | — | — |
| 11 | 35.991 | 1.70 | 1.80518 | 25.4 |
| 12 | 23.588 | 8.92 | 1.48749 | 70.2 |
| 13 | 208.360 | 0.10 | — | — |
| 14 | 47.000 | 4.46 | 1.77250 | 49.6 |
| 15 | 365.980 | 1.87–12.75–21.91 | — | — |
| STOP | ∞ | 1.68 | — | — |
| 16 | −762.000 | 3.59 | 1.84666 | 23.9 |
| 17 | −35.114 | 1.50 | 1.74400 | 44.8 |
| 18 | 66.339 | 3.00 | — | — |
| 19 | −37.256 | 1.79 | 1.80610 | 40.9 |
| 20 | −62.130 | 15.58–7.91–1.90 | — | — |
| 21 | −107.048 | 5.04 | 1.59240 | 68.3 |
| 22 | −26.608 | 0.10 | — | — |
| 23 | 57.346 | 4.07 | 1.59240 | 68.3 |
| 24 | −101.400 | 2.47 | — | — |
| 25 | −28.799 | 1.50 | 1.75520 | 27.5 |
| 26 | −112.103 | — | — | — |

Figure 13:
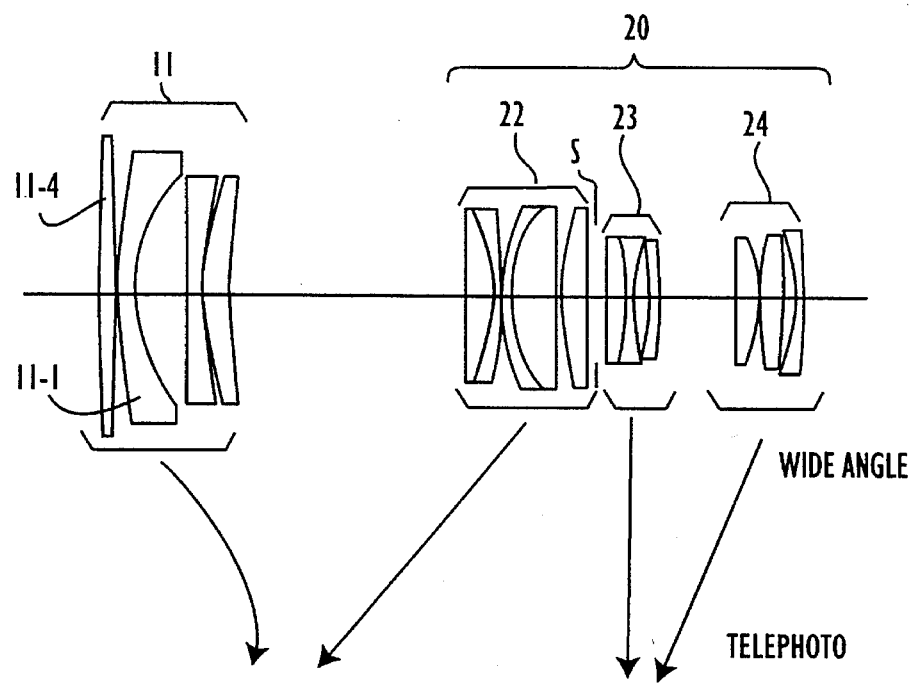
FIG. 13 is a schematic view of a lens arrangement of a zoom lens system, according to a fourth embodiment of the present invention.

*marked surface is aspherical.
NO. 3: $K = -0.1000$, $A4 = 0.32045 \times 10^{-5}$,
$A6 = 0.34954 \times 10^{-9}$, $A8 = 0.20117 \times 10^{-11}$,
$A10 = 0.27659 \times 10^{-15}$, $A12 = 0.0$ FIG. 13 shows a lens arrangement of a zoom lens according to a fourth embodiment of the present invention. In the fourth embodiment, the first lens group includes a weak positive power lens 11-4 in front of the first negative lens 11-1. The other structure of the fourth embodiment is substantially the same as the first embodiment. Note that there is no aspherical surface in the rear lens group of the fourth embodiment.

Figure 14:
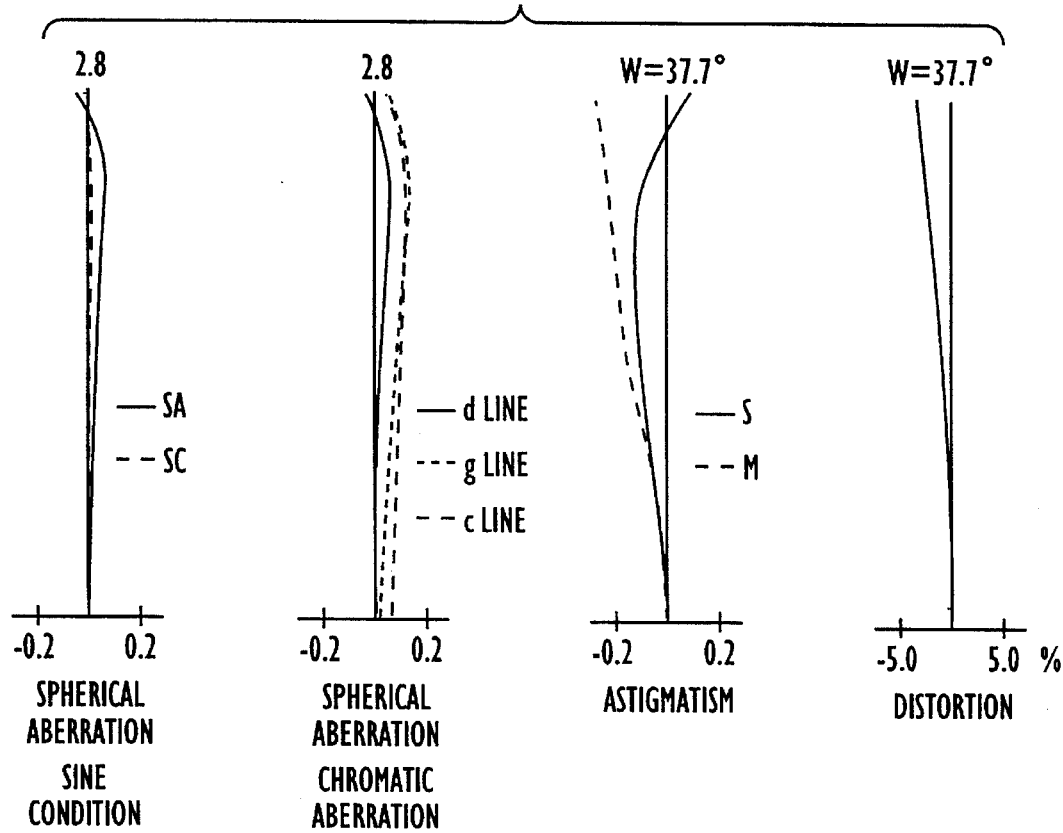
FIG. 14 shows various aberration diagrams of a zoom lens system shown in FIG. 13 at a wide angle extremity thereof.
Figure 15:
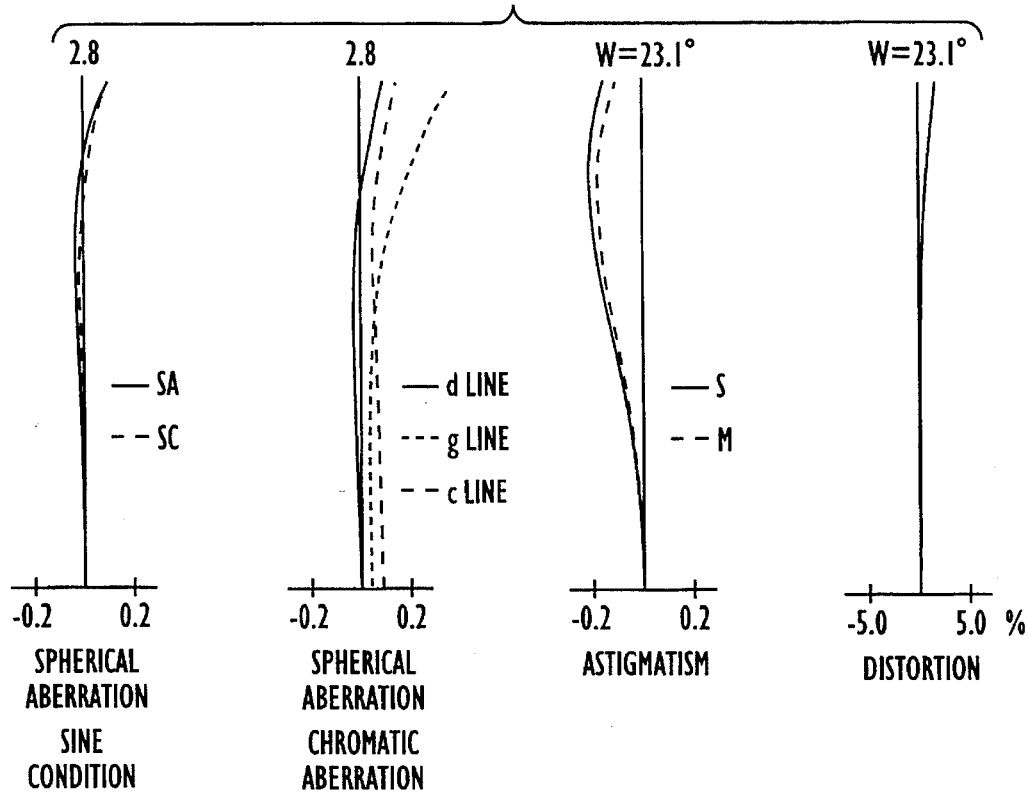
FIG. 15 shows various aberration diagrams of a zoom lens system shown in FIG. 13 at an intermediate focal length; and, FIG. 16 shows various aberration diagrams of a zoom lens system shown in FIG. 13 at a telephoto extremity.
Figure 16:
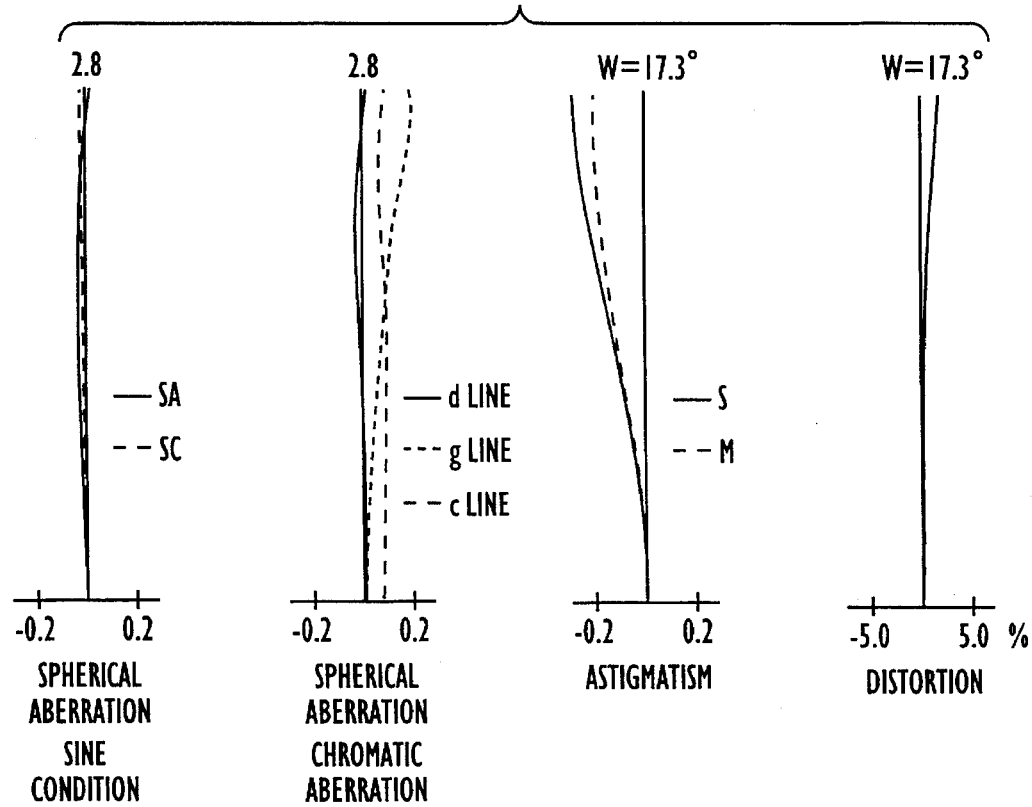

Numerical data of the lens system shown in FIG. 13 is shown in Table 4 below. Diagrams of various aberrations thereof at a wide-angle extremity, an intermediate focal length and a telephoto extremity are shown in FIGS. 14, 15 and 16, respectively.

TABLE 4

$F_{NO} = 1:2.8–2.8–2.8$
$f = 29.00–50.00–68.00$
$\omega = 37.7–23.1–17.3$
$f_B = 39.76–39.75–39.75$

| surface No. | r | d | Nd | vd |
|---|---|---|---|---|
| 1 | 946.380 | 2.10 | 1.76182 | 26.5 |
| 2 | −2025.124 | 0.20 | — | — |
| 3 | 214.692 | 2.00 | 1.77250 | 49.6 |
| 4 | 31.143 | 0.13 | 1.52010 | 50.8 |
| 5* | 28.252 | 9.90 | — | — |
| 6 | 372.981 | 2.00 | 1.72916 | 54.7 |
| 7 | 56.775 | 0.20 | — | — |
| 8 | 44.072 | 5.10 | 1.84666 | 23.9 |
| 9 | 109.751 | 46.14–14.01–2.99 | — | — |
| 10 | 885.049 | 6.00 | 1.77250 | 49.6 |
| 11 | −37.012 | 1.50 | 1.68893 | 31.1 |
| 12 | −221.807 | 0.20 | — | — |
| 13 | 37.338 | 1.70 | 1.80518 | 25.4 |
| 14 | 23.961 | 8.10 | 1.48749 | 70.2 |
| 15 | 131.953 | 0.70 | — | — |
| 16 | 44.859 | 4.80 | 1.77250 | 49.6 |
| 17 | 349.468 | 2.07–13.22–22.45 | — | — |
| STOP | ∞ | 1.53 | — | — |
| 18 | −3313.133 | 3.30 | 1.84666 | 23.9 |
| 19 | −41.282 | 1.50 | 1.74320 | 49.3 |
| 20 | 64.841 | 3.20 | — | — |
| 21 | −35.818 | 1.60 | 1.80610 | 40.9 |
| 22 | −58.767 | 15.33–7.91–1.90 | — | — |
| 23 | −118.103 | 4.70 | 1.59240 | 68.3 |
| 24 | −27.071 | 0.10 | — | — |
| 25 | 61.274 | 5.00 | 1.59240 | 68.3 |
| 26 | −96.714 | 2.50 | — | — |
| 27 | −28.769 | 1.50 | 1.76182 | 26.5 |
| 28 | −98.460 | — | — | — |

Figure 17:
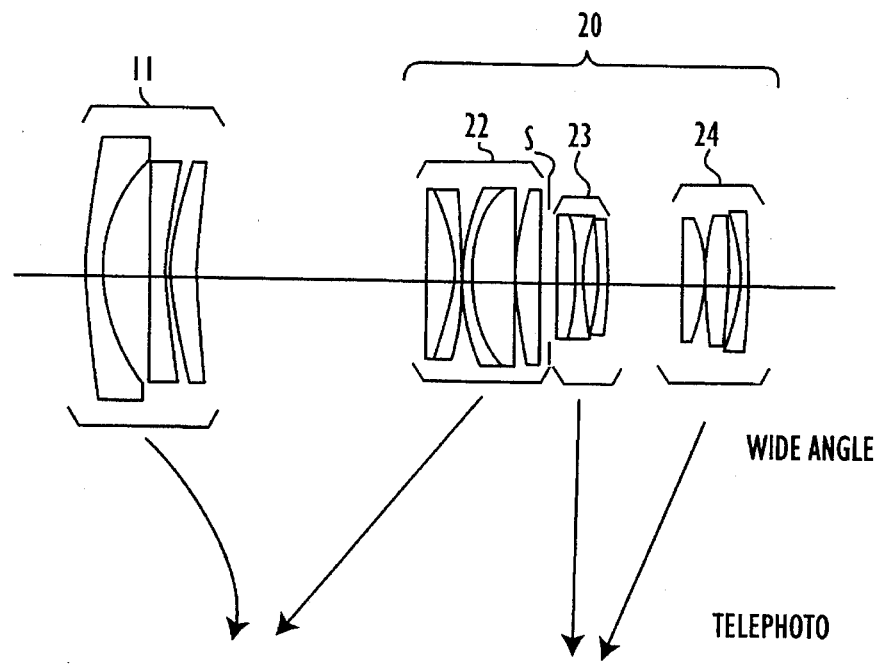
FIG. 17 is a schematic view of a lens arrangement of a zoom lens system, according to a fifth embodiment of the present invention.

*marked surface is aspherical.
NO. 5: $K = -0.10000$, $A4 = 0.24797 \times 10^{-5}$,
$A6 = 0.40385 \times 10^{-9}$, $A8 = 0.14228 \times 10^{-11}$,
$A10 = -0.16641 \times 10^{-15}$, $A12 = 0.0$ FIG. 17 shows a lens arrangement of a zoom lens according to a fifth embodiment of the present invention. In the fifth embodiment, the surface of the first negative lens 11-1 of the first lens group 11 that is located on the image side is an aspherical glass surface and does not include a resin layer. Furthermore, the rear lens group does not include an aspheric surface. The other structure of the fifth embodiment is substantially the same as the first embodiment.

Figure 18:
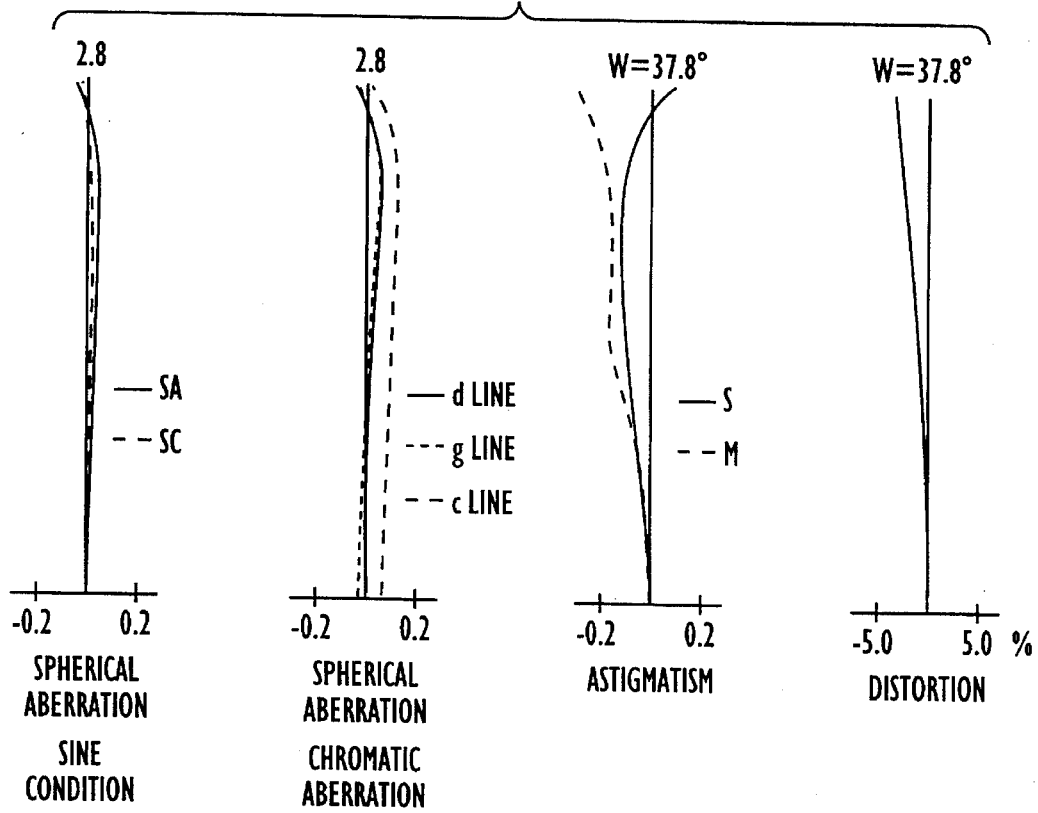
FIG. 18 shows various aberration diagrams of a zoom lens system shown in FIG. 17 at a wide angle extremity thereof.
Figure 19:
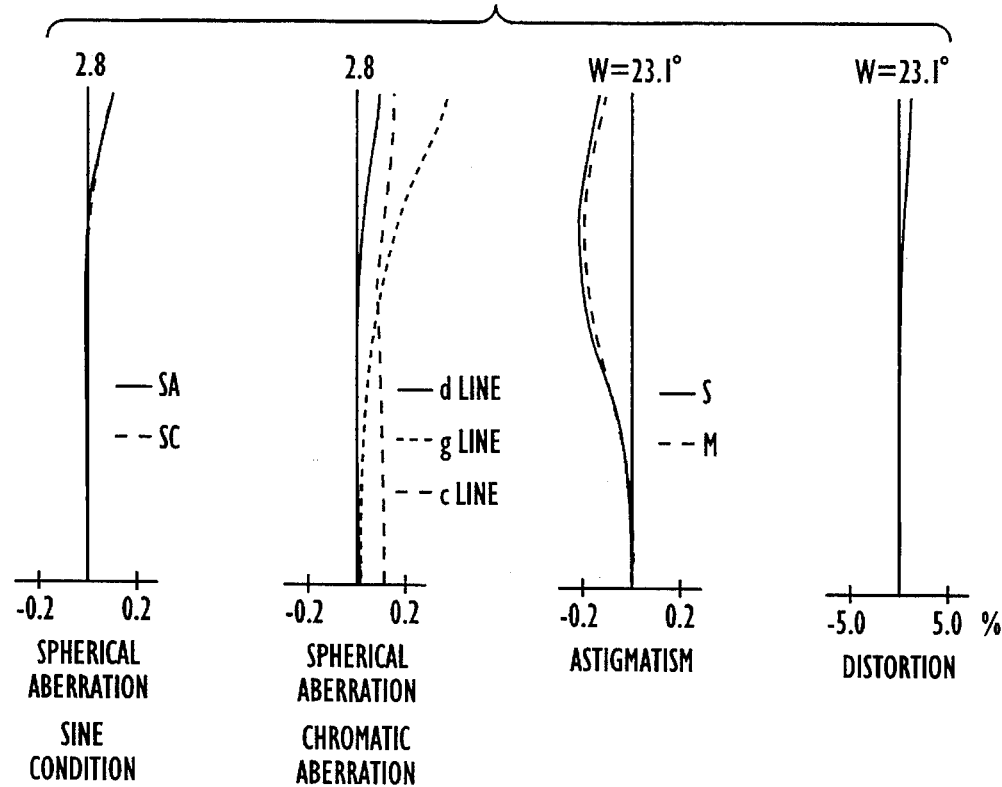
FIG. 19 shows various aberration diagrams of a zoom lens system shown in FIG. 17 at an intermediate focal length; and, FIG. 20 shows various aberration diagrams of a zoom lens system shown in FIG. 17 at a telephoto extremity.
Figure 20:
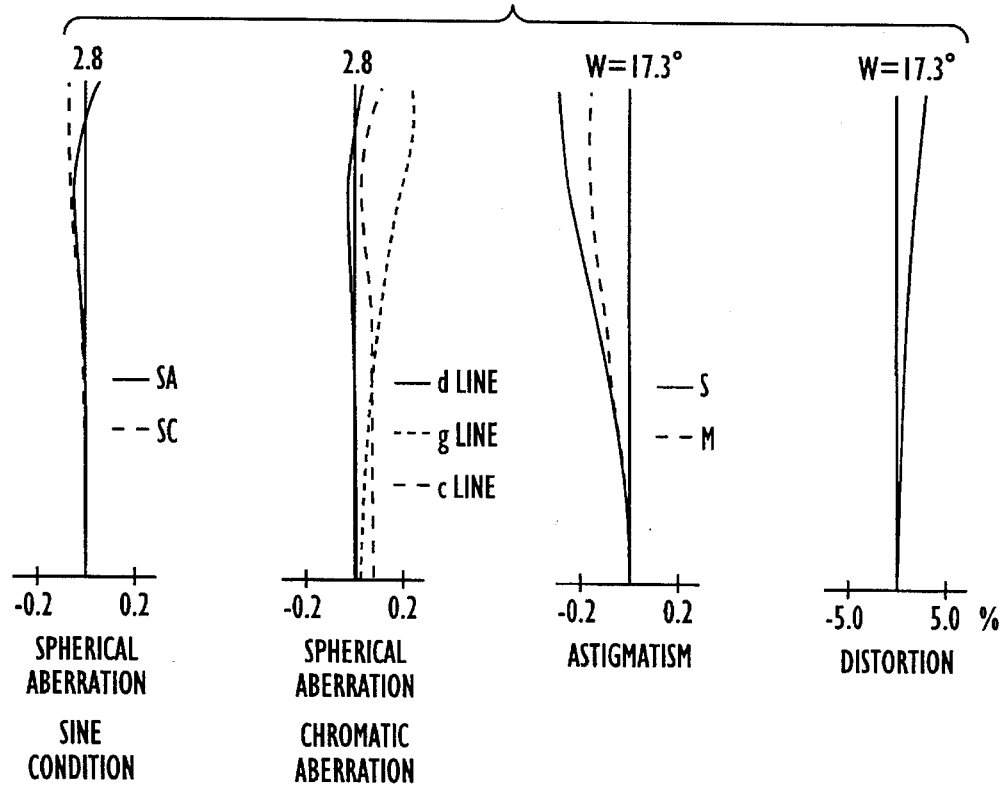

Numerical data of the lens system shown in FIG. 17 is shown in Table 5 below. Diagrams of various aberrations thereof at a wide-angle extremity, an intermediate focal length and a telephoto extremity are shown in FIGS. 18, 19 and 20, respectively.

TABLE 5

$F_{NO} = 1:2.8-2.8-2.8$
$f = 29.00-50.00-68.00$
$\omega = 37.8-23.1-17.3$
$f_B = 39.86-39.85-39.85$

| surface No. | r | d | Nd | νd |
|---|---|---|---|---|
| 1 | 142.563 | 2.00 | 1.77250 | 49.6 |
| 2* | 29.371 | 9.90 | — | — |
| 3 | 589.333 | 2.00 | 1.72916 | 54.7 |
| 4 | 57.844 | 0.55 | — | — |
| 5 | 45.772 | 5.12 | 1.84666 | 23.9 |
| 6 | 117.239 | 45.91-14.02-3.11 | — | — |
| 7 | 2292.096 | 5.90 | 1.77250 | 49.6 |
| 8 | -37.764 | 1.50 | 1.68893 | 31.1 |
| 9 | -170.564 | 0.10 | — | — |
| 10 | 37.431 | 1.70 | 1.80518 | 25.4 |
| 11 | 24.023 | 8.00 | 1.48749 | 70.2 |
| 12 | 114.789 | 0.10 | — | — |
| 13 | 44.002 | 4.80 | 1.77250 | 49.6 |
| 14 | 292.417 | 2.15-13.24-22.46 | — | — |
| STOP | ∞ | 1.52 | — | — |
| 15 | -21691.817 | 3.30 | 1.84666 | 23.9 |
| 16 | -41.191 | 1.50 | 1.74320 | 49.3 |
| 17 | 66.539 | 3.00 | — | — |
| 18 | -37.044 | 1.63 | 1.80610 | 40.9 |
| 19 | -67.314 | 15.54-8.21-2.38 | — | — |
| 20 | -180.116 | 5.00 | 1.59240 | 68.3 |
| 21 | -27.614 | 0.10 | — | — |
| 22 | 63.290 | 5.00 | 1.59240 | 68.3 |
| 23 | -92.026 | 2.47 | — | — |
| 24 | -28.946 | 1.50 | 1.76182 | 26.5 |
| 25 | -111.878 | — | — | — |

Figure 21:
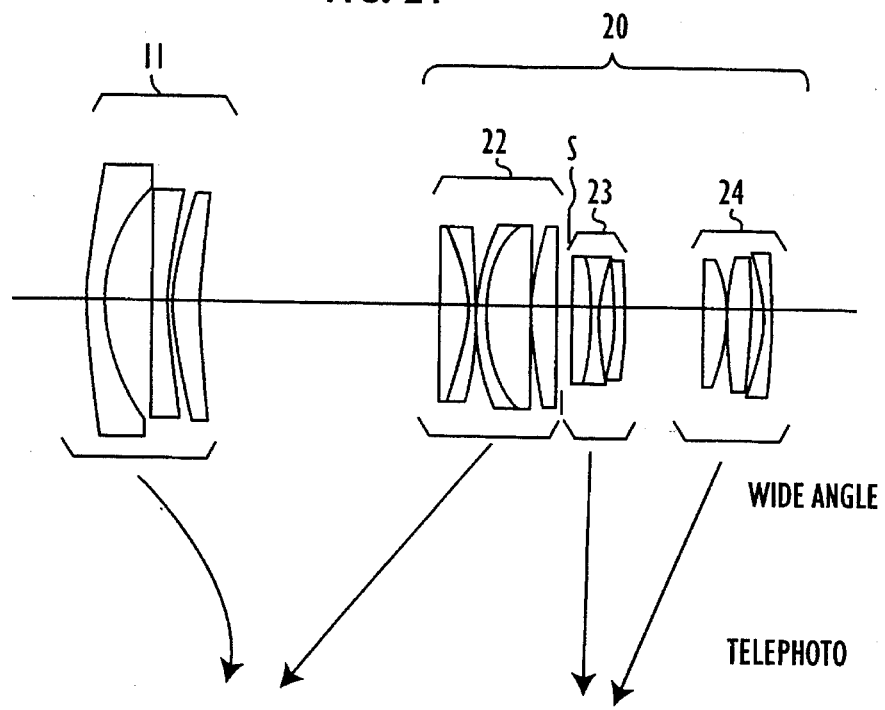
FIG. 21 is a schematic view of a lens arrangement of a zoom lens system, according to a sixth embodiment of the present invention.

*marked surface is aspherical.
NO. 2: $K = -0.10000$, $A4 = 0.29616 \times 10^{-5}$,
$A6 = 0.62403 \times 10^{-9}$, $A8 = 0.15674 \times 10^{-11}$,
$A10 = -0.20023 \times 10^{-15}$, $A12 = 0.0$ FIG. 21 shows a lens arrangement of a zoom lens according to a sixth embodiment of the present invention. In the sixth embodiment, the rear lens group does not include an aspherical surface. The other structure of the fifth embodiment is substantially the same as the first embodiment.

Figure 22:
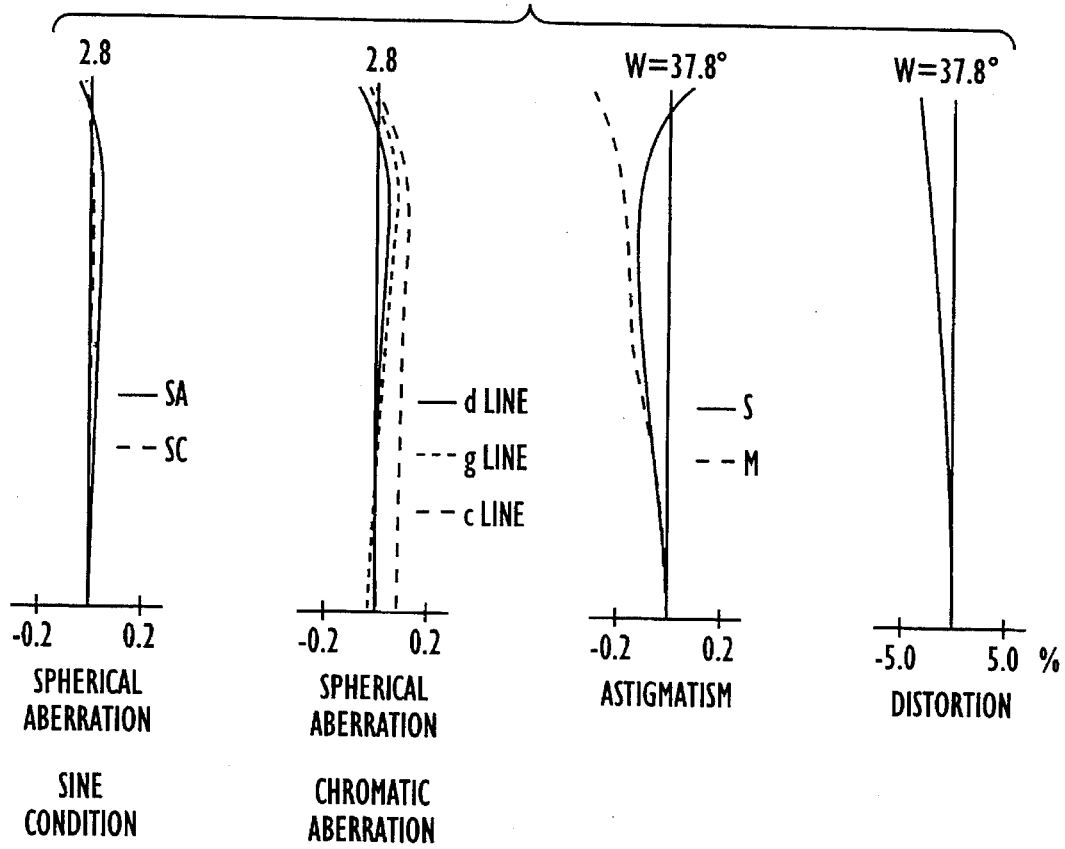
FIG. 22 shows various aberration diagrams of a zoom lens system shown in FIG. 21 at a wide angle extremity thereof.
Figure 23:
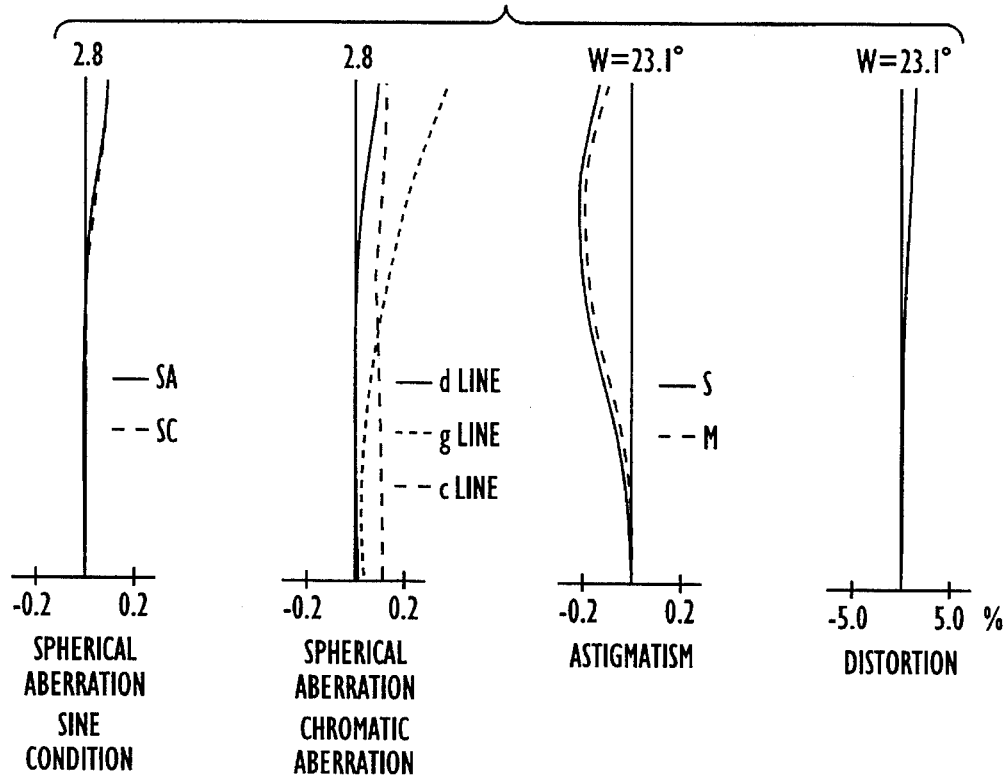
FIG. 23 shows various aberration diagrams of a zoom lens system shown in FIG. 21 at an intermediate focal length.
Figure 24:
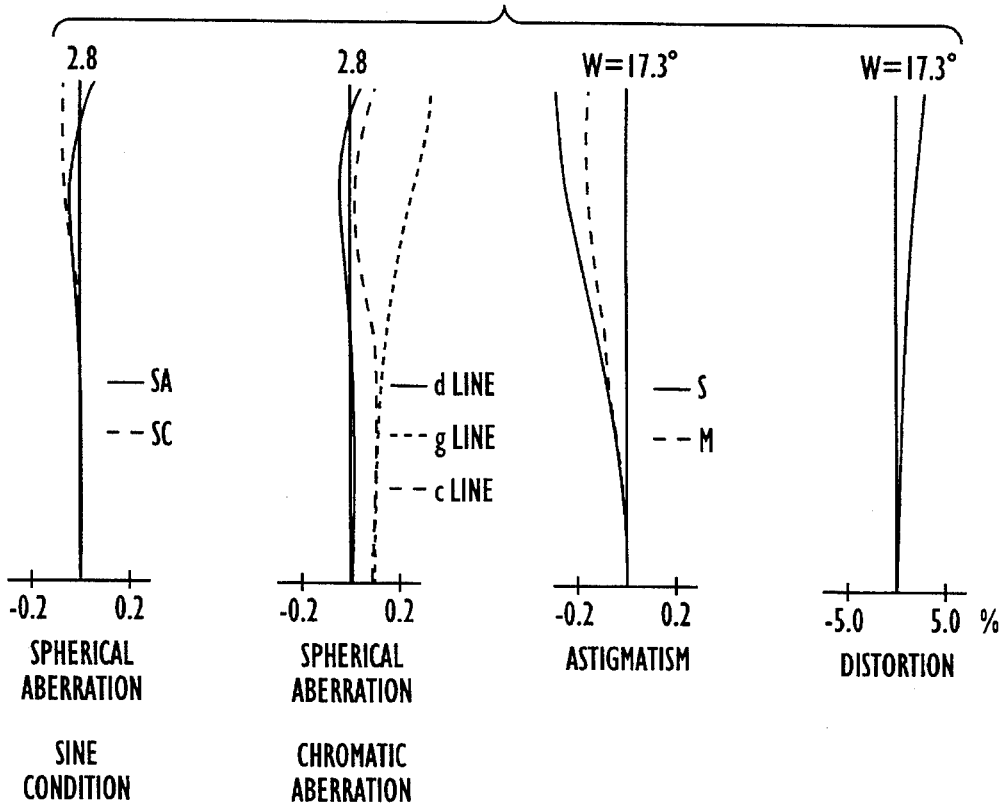
FIG. 24 shows various aberration diagrams of a zoom lens system shown in FIG. 21 at a telephoto extremity.

Numerical data of the lens system shown in FIG. 21 is shown in Table 6 below. Diagrams of various aberrations thereof at a wide-angle extremity, an intermediate focal length and a telephoto extremity are shown in FIGS. 22, 23 and 24, respectively.

TABLE 6

$F_{NO} = 1:2.8-2.8-2.8$
$f = 29.00-50.00-68.00$
$\omega = 37.8-23.1-17.3$
$f_B = 39.79-39.78-39.78$

| surface NO. | r | d | Nd | νd |
|---|---|---|---|---|
| 1 | 136.460 | 2.00 | 1.77250 | 49.6 |
| 2 | 31.408 | 0.13 | 1.52010 | 50.8 |
| 3* | 28.502 | 9.98 | — | — |
| 4 | 912.000 | 2.00 | 1.72916 | 54.7 |
| 5 | 58.481 | 0.63 | — | — |
| 6 | 45.946 | 5.06 | 1.84666 | 23.9 |
| 7 | 116.372 | 45.70-13.81-2.92 | — | — |
| 8 | 680.500 | 6.03 | 1.77250 | 49.6 |
| 9 | -39.398 | 1.50 | 1.68893 | 31.1 |
| 10 | -184.399 | 0.10 | — | — |
| 11 | 37.330 | 1.70 | 1.80518 | 25.4 |
| 12 | 23.800 | 7.88 | 1.48749 | 70.2 |
| 13 | 102.957 | 0.46 | — | — |
| 14 | 43.860 | 4.88 | 1.77250 | 49.6 |
| 15 | 337.500 | 1.99-13.07-22.35 | — | — |
| STOP | ∞ | 1.54 | — | — |
| 16 | 7200.000 | 3.26 | 1.84666 | 23.9 |
| 17 | -42.600 | 1.50 | 1.74320 | 49.3 |
| 18 | 66.247 | 3.00 | — | — |
| 19 | -38.421 | 1.61 | 1.80610 | 40.9 |
| 20 | -69.147 | 15.70-8.07-2.06 | — | — |
| 21 | -130.514 | 5.00 | 1.59240 | 68.3 |
| 22 | -22.946 | 0.10 | — | — |
| 23 | 60.350 | 4.60 | 1.59240 | 68.3 |
| 24 | -96.477 | 2.43 | — | — |
| 25 | -28.909 | 1.50 | 1.76182 | 26.5 |
| 26 | -108.937 | — | — | — |

*marked surface is aspherical.
NO. 3: $K = -0.10000$, $A4 = 0.24918 \times 10^{-5}$,
$A6 = 0.12171 \times 10^{-9}$, $A8 = 0.16983 \times 10^{-11}$,
$A10 = -0.72798 \times 10^{-15}$, $A12 = 0.0$ The values of the formulae (1) through (8) in the six embodiments are shown in Table 7 below. Note that the values in the formulae (5) and (7) are not absolute values but have positive or negative signs.

TABLE 7

| | Embodiment 1 | Embodiment 2 | Embodiment 3 |
|---|---|---|---|
| formula (1) | 0.53 | 0.53 | 0.54 |
| formula (2) | -0.0251 | -0.0285 | -0.0167 |
| formula (3) | 0.53 | 0.51 | 0.50 |
| formula (4) | 0.134 | 0.134 | 0.090 |
| formula (5) | -1.418 | -1.386 | -1.483 |
| formula (6) | 1.031 | 1.039 | 1.044 |
| formula (7) | -0.031 | -0.02 | -0.016 |
| formula (8) | 2.76 | 2.76 | 2.76 |

| | Embodiment 4 | Embodiment 5 | Embodiment 6 |
|---|---|---|---|
| formula (1) | 0.54 | 0.53 | 0.53 |
| formula (2) | -0.0208 | -0.0221 | -0.0202 |
| formula (3) | 0.51 | 0.78 | 0.51 |
| formula (4) | 0.100 | — | 0.100 |
| formula (5) | -1.430 | -1.420 | -1.435 |
| formula (6) | 1.041 | 1.036 | 1.044 |
| formula (7) | -0.052 | -0.092 | -0.06 |
| formula (8) | 2.76 | 2.76 | 2.76 |

As can be seen from Table 7 above, all the six embodiments satisfy the requirements defined by the formulae (1) through (8). Moreover, according to present invention, the various aberrations at a wide-angle extremity, an intermediate focal length and a telephoto extremity can be correctly compensated.

As may be understood from the above discussion, according to the present invention, a zoom lens of a large aperture in which the magnification is approximately 2.5 to 3; the f numbers is approximately 2.8; and a first lens group which is small can be obtained.

I claim:

1. A zoom lens comprising a first lens group having a negative power and a rear lens group having a variable positive power, arranged in this order from an object side, wherein:

said first lens group comprising at least one negative lens and at least one positive lens;

said negative lens of said first lens group, located closest to an object, includes a concave surface located on an image side;

said concave surface comprising an aspherical surface whose radius of curvature increases to reduce the negative power as the height of said concave surface from an optical axis increases; and, said aspherical surface satisfies the formulae:

$0.2 < H_{open}/H_{effect} < 0.7$; and $-0.1 < (\Delta X/f_w)\cdot(N-1) < -0.01$, wherein "$H_{open}$" designates a height at which an axial marginal ray passes through said aspherical surface at a telephoto extremity;

"$H_{effect}$" designates a maximum height at which an off-axis ray passes through said aspherical surface at a wide angle extremity; "$\Delta X$" designates an amount of asphericity at an effective height;

"$f_w$" designates a focal length at said wide angle extremity; and

"N" designates a refractive index of lens material from which said aspherical surface is made.

2. A zoom lens according to claim 1, wherein said aspherical surface satisfies the formula:

$0.2 < (R_{ASP}/f_w)\cdot(N-1) < 1.0$, wherein "$R_{ASP}$" designates a paraxial radius of curvature of said aspherical surface.

3. A zoom lens according to claim 1, said aspherical surface comprising a resin layer cemented to a glass lens.

4. A zoom lens according to claim 3, wherein said aspherical surface satisfies the formula:

$0.03 < (R_1 - R_2)/f_w < 0.2$, wherein "$R_1$" designates a radius of curvature of a cemented surface formed between said resin layer and said glass lens; and, "$R_2$" designates a paraxial radius of curvature of said aspherical surface.

5. A zoom lens according to claim 1, the rear lens group comprising at least three lens groups including a second lens group having a positive power, a third lens group having a negative power, and a fourth lens group having a positive power, in this order from an object side, so that a distance between said second and said third lens groups increases and a distance between said third and said fourth lens groups decreases during a transition of magnification from said wide angle extremity toward said telephoto extremity.

6. A zoom lens system according to claim 1, said first lens group comprising a first negative lens, a second negative lens, and a positive lens, in this order from the object side.

7. A zoom lens comprising:

a first lens group having a negative power;

a second lens group having a positive power;

a third lens group having a negative power; and a fourth lens group having a positive power;

wherein a distance between said second and said third lens groups increases and a distance between said third and said fourth lens groups decreases during a transition of magnification from a wide angle extremity towards a telephoto extremity, and wherein the zoom lens satisfies the formulae:

$1.1 < |f_t/f_1| < 1.9$;

$0.9 < Z_2/Z < 1.1$; and $|m_{4t}| < 0.12$, wherein "$f_t$" designates a focal length at said telephoto extremity;

"$f_1$" designates a focal length of said first lens group;

"$Z_2$" designates a ratio of magnifications of said second lens group, where $Z_2 = m_{2t}/m_{2w}$, and $m_{2t}$ designates magnification of said second lens group at the said telephoto extremity, and $m_{2w}$ designates a magnification of said second lens group at said wide angle extremity;

"Z" designates a zooming ratio of the whole lens system; and

"$m_{4t}$" designates a magnification of aid fourth lens group at said telephoto extremity.

8. A zoom lens according to claim 7, further comprising a diaphragm provided between said second and said third lens groups, so that a distance between said diaphragm and an image plane of said zoom lens satisfies the formula:

$2.3 < X_s/f_w < 2.85$, wherein "$X_s$" designates a distance between said diaphragm and said image plane at said wide angle extremity; and, "$f_w$" designates a focal length at said wide angle extremity.

9. A zoom lens according to claim 8, wherein said third lens group is integrally secured to said diaphragm so as not to move during zooming.

* * * * *

UNITED STATES PATENT AND TRADEMARK OFFICE
CERTIFICATE OF CORRECTION

PATENT NO. : 5,568,323
DATED : October 22, 1996
INVENTOR(S) : T. SENSUI

It is certified that error appears in the above-identified patent and that said Letters Patent is hereby corrected as shown below:

At column 9, line 61 (Table 3) of the printed patent, "K=-0.1000" should be ---K=-0.1000E01---.

At column 10, line 47 (Table 4) of the printed patent, "K=-0.1000" should be ---K=-0.1000E01---.

At column 11, line 32 (Table 5) of the printed patent, "K=-0.1000" should be ---K=-0.1000E01---.

At column 12, line 14 (Table 6) of the printed patent, "K=-0.1000" should be ---K=-0.1000E01---.

Signed and Sealed this

Twenty-first Day of December, 1999

*Attest:*

Q. TODD DICKINSON

*Attesting Officer*        *Acting Commissioner of Patents and Trademarks*